(12) United States Patent
Ngan et al.

(10) Patent No.: US 8,180,146 B2
(45) Date of Patent: May 15, 2012

(54) METHOD AND APPARATUS FOR RECOGNIZING AND LOCALIZING LANDMARKS FROM AN IMAGE ONTO A MAP

(75) Inventors: King Ngi Ngan, Sha Tin (HK); Bangsheng Cheng, Tai Po (HK)

(73) Assignee: The Chinese University of Hong Kong, Hong Kong (HK)

( * ) Notice: Subject to any disclaimer, the term of this patent is extended or adjusted under 35 U.S.C. 154(b) by 293 days.

(21) Appl. No.: 12/644,328

(22) Filed: Dec. 22, 2009

(65) Prior Publication Data
US 2011/0150324 A1    Jun. 23, 2011

(51) Int. Cl.
*G06K 9/62* (2006.01)
(52) U.S. Cl. .......................... 382/159; 382/254; 382/153
(58) Field of Classification Search .................. 382/159, 382/153, 254
See application file for complete search history.

(56) References Cited

U.S. PATENT DOCUMENTS

| | | | |
|---|---|---|---|
| 3,069,654 A | 12/1962 | Hough | |
| 6,711,293 B1 | 3/2004 | Lowe | |
| 2004/0049341 A1 | 3/2004 | Fujiwara | |
| 2004/0236543 A1 | 11/2004 | Stephens | |
| 2006/0012677 A1 | 1/2006 | Neven, Sr. et al. | |
| 2006/0165276 A1 | 7/2006 | Hong et al. | |
| 2006/0240862 A1 | 10/2006 | Neven et al. | |
| 2007/0086675 A1 | 4/2007 | Chinen et al. | |
| 2007/0159522 A1 | 7/2007 | Neven | |
| 2007/0214172 A1 | 9/2007 | Nister et al. | |
| 2008/0042349 A1 | 2/2008 | Killgo et al. | |
| 2008/0118105 A1 | 5/2008 | Friedhoff et al. | |
| 2008/0247660 A1 | 10/2008 | Zhang et al. | |
| 2009/0037403 A1 | 2/2009 | Joy et al. | |
| 2009/0073265 A1 | 3/2009 | Greenhill et al. | |

OTHER PUBLICATIONS

Ballard, D.H., "Generalizing the Hough Transform to Detect Arbitrary Shapes", Pattern Recognition, 13, 2 (1981), pp. 111-122.
"Building Recognition System," published in the Shenzhen High-Tech Fair, (brochure), Nov. 16-21, 2009, Shenzhen, People's Republic of China.
Fischler et al., "Random Sample Consensus: A Paradigm for Model Fitting with Applications to Image Analysis and Automated Cartography". Graphics and Image Processing, vol. 24, No. 6, Jun. 1981.
Lindeberg T., "Detecting Salient Blob-like Image Structures and their scales with a Scale-Space Primal Sketch: A Method for Focus-of-Attention," International Journal of Computer Vision, 11:3, 283-318 (1993).
Lowe D., "Distinctive Image Features from Scale-Invariant Keypoints", International Journal of Computer Vision, 60:2, 91-110 (2004).
Schmid et al., "Local Grayvalue Invariants for Image Retrieval", IEEE PAMI, 19, 5 (1997), pp. 530-535.

*Primary Examiner* — Samir Ahmed
*Assistant Examiner* — Ruiping Li
(74) *Attorney, Agent, or Firm* — Kilpatrick Townsend & Stockton LLP; Kenneth R. Allen

(57) ABSTRACT

Method and apparatus for recognizing landmark buildings in an image and then locating the recognized landmark buildings onto a map together with related information wherein a first database is employed to store models formed by mathematical set descriptions of landmark buildings which are learned from a set of training images of a model-learning module captured by an imaging device for each building, and a second database is employed to store the related information of each landmark building. The model of each landmark building is represented as a set of features and the geometric relationship between them by clustering the salient features extracted from a set of training images of the landmark building.

15 Claims, 13 Drawing Sheets

METHOD AND APPARATUS FOR RECOGNIZING AND LOCALIZING LANDMARKS FROM AN IMAGE ONTO A MAP

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to object recognition and more particularly to landmark building identification and locating using image recognition techniques.

Location-based services (LBS) are used for providing information and entertainment and are often accessible with mobile devices through the mobile network utilizing the ability to make use of the geographical positioning system (GPS) of the mobile device. LBS can be used in a variety of contexts, such as health, work, personal life, etc. For example, LBS may include services to identify a location of a person or object, such as discovering the nearest automated teller machine (ATM) of a bank or the whereabouts of a friend or employee. LBS also routinely includes parcel tracking and vehicle tracking. LBS can include mobile commerce, taking advantage of mobile services in the form of coupons or advertising directed at customers based on their current location. Other LBS offerings include personalized weather services, location-based games, location-based tourist guides, location-based shopping guides, and location-based blind assistance.

Conventional outdoor location-based services are mainly based on GPS and GSM networks with specialized receivers including mobile telephones so equipped, and indoor location-based services are mainly based on Bluetooth, UWB, RFID and Wi-Fi technologies. Such technologies are useful for locating the geographical position of a user possessing a mobile device. Nevertheless it is difficult to recognize a building, particularly if the appearance of the building as seen by the user on the ground does not match that provided by the map provider.

What is needed is a mechanism to capitalize on existing technology to enhance location-based services.

The following patents and USPTO publications were uncovered in a search of literature related to LBS technology and recognition technology: 20090073265 VIRTUAL OBSERVER; 20080247660 AUTOMATIC DETECTION AND MAPPING OF SYMMETRIES IN AN IMAGE; 20070214172 SCALABLE OBJECT RECOGNITION USING HIERARCHICAL QUANTIZATION WITH A VOCABULARY TREE; 20070159522 IMAGE-BASED CONTEXTUAL ADVERTISEMENT METHOD AND BRANDED BARCODES; 20070086675 SEGMENTING IMAGES AND SIMULATING MOTION BLUR USING AN IMAGE SEQUENCE; 20060240862 MOBILE IMAGE-BASED INFORMATION RETRIEVAL SYSTEM; 20060165276 APPARATUS AND METHOD FOR ESTIMATING LOCATION OF MOBILE BODY AND GENERATING MAP OF MOBILE BODY ENVIRONMENT USING UPPER IMAGE OF MOBILE BODY ENVIRONMENT, AND COMPUTER READABLE RECORDING MEDIUM STORING COMPUTER PROGRAM CONTROLLING THE APPARATUS; 20060012677 IMAGE-BASED SEARCH ENGINE FOR MOBILE PHONES WITH CAMERA; 20080118105 METHOD AND SYSTEM FOR LEARNING OBJECT RECOGNITION IN IMAGES; 20090037403 GENERALIZED LOCATION IDENTIFICATION; 20080042349 BOARD GAME PLAYING SYSTEM AND METHOD OF INCORPORATING CITY LANDMARKS; 20040236543 SIMULATED CITY GENERATION; 0040049341 NAVIGATION APPARATUS;

SUMMARY OF THE INVENTION

According to the invention, a method and apparatus are provided for recognizing landmark buildings in an image and then locating the recognized landmark buildings onto a map together with related information wherein a first database is employed to store models formed by mathematical set descriptions of landmark buildings which are learned from a set of training images of a model-learning module captured by an imaging device for each building, and a second database is employed to store the related information of each landmark building. The model of each landmark building is represented as a set of prototypes which are further represented as sets of features and the geometric relationship between them by clustering the salient features extracted from a set of training images of the landmark building.

The model-learning module captures the training images for each landmark building and extracts the local salient features from each training image, then creates mathematical descriptions for each feature to describe the semantic content and geometric information of the building. Thereafter each landmark building model is represented as a set of prototypes which are further represented as the set of features and the geometric relationship between them, by clustering the extracted features from the set of training images of the landmark building. Each landmark building model is stored in the first database as a list of prototype records which are further represented as a list of feature records with feature ID, feature descriptor, and geometric information.

An administration module of the landmark building recognition system has the functionalities of accessing, adding, deleting, and editing the landmark building models of the database to update the buildings' models for recognition.

A building recognition module captures the images of each landmark building and extracts the local salient features from these images, then creates binary bit strings for each feature to describe its semantic content compactly, then these features are matched to the features of each landmark building model stored in the database to calculate the similarity score between the input image and the stored landmark building model. A building in the input image is recognized based on the calculated similarity scores, and the name, the location and other basic information of the recognized landmark building are retrieved from the first database. The recognized building is then marked on an electronic map image to indicate its location, and related information about this building or its contents retrieved from the second database based on the recognized building's ID is presented to users through text, linked web pages or multimedia content.

The present landmark building recognition system is able to identify a building from an image captured by a digital camera and provide the related information to the user via the Internet. This greatly enhances the location-based services such as location-based tourist guides, location-based shopping guides, location-based game, and location-based information services. The system can be deployed in any locality such as a city, shopping mall, university, where a user needs to recognize a building for its identity or merely to verify its location on the ground in relation to the geographical location provided by a map.

The invention will be better understood by reference to the following detailed description and accompanying drawings.

DETAILED DESCRIPTION OF SPECIFIC EMBODIMENTS

Landmark building recognition system can be divided into two stages: construction of a database of a set of models of landmark buildings, and recognition of the landmark buildings from an input image including return of related information of the recognized landmark buildings to users. The present system develops four key techniques: salient feature extraction, feature description, model learning, and object recognition.

Figure 1:
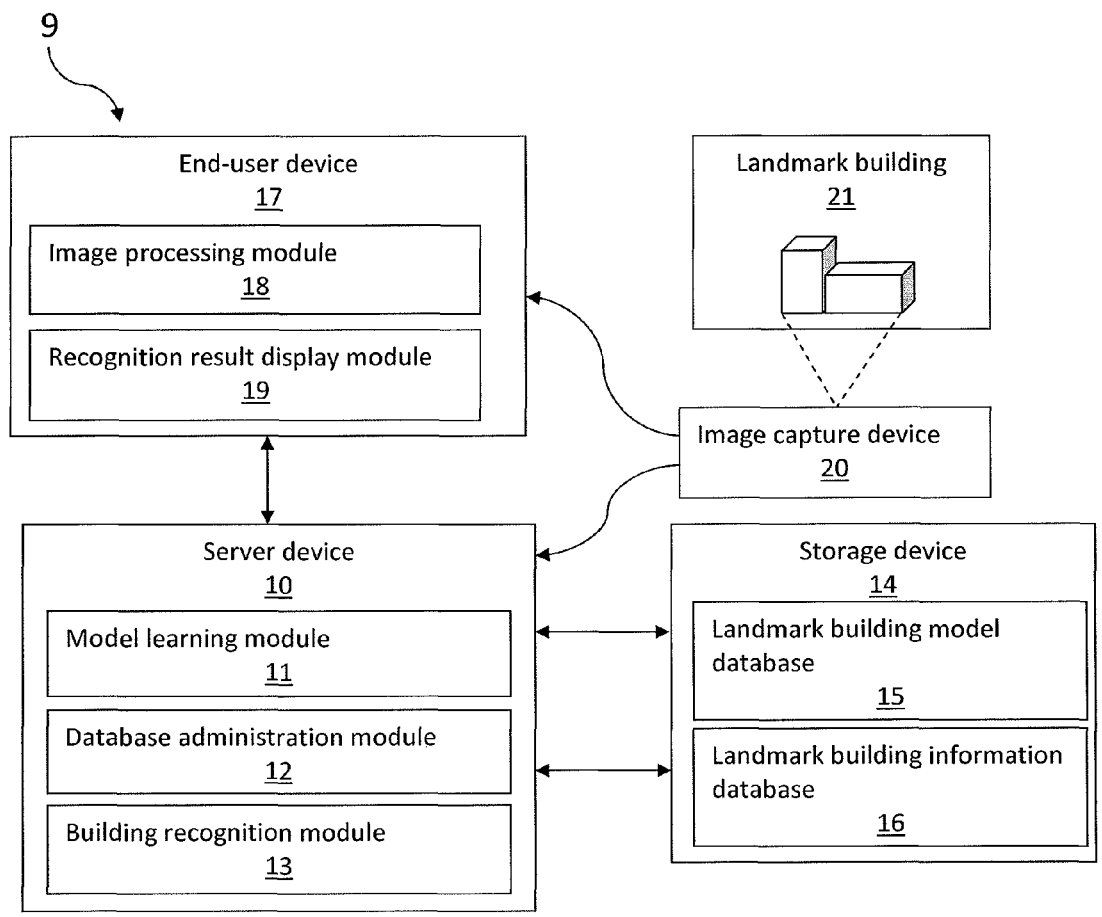
FIG. 1 is a block diagram of an apparatus for recognizing landmark buildings in an image.

Referring to FIG. 1, an apparatus 9 according to a specific embodiment of the invention is shown. The apparatus includes a server 10, a storage device 14, an end-user device 17, and an image capture device 20 which together with operational elements constitute a system according to the invention. The image capture device 20 is configured to capture images of an exemplary landmark building 21 from different positions and viewpoints, and to transmit these captured images to the server device 10 and also to the end-user device 17. (It is noted that the image capture device and the end user device may be incorporated into a single structure, such as a camera equipped mobile phone having a transceiver, a GPS element, a display element and a micro-processing unit.) The server device 10 is a data processing device supporting operation of three modules, typically embodied in software or firmware: a model learning module 11, a database administration module 12, and a building recognition module 13.

The model learning module 11 is operative to receive and process the captured images from device 20 and to learn the models of the landmark building 21, and it is further operative to store these learned landmark building models in the storage device 14 in a landmark building model database 15. Certain related information about the landmark building 21 may be added to or otherwise included in a landmark building information database 16 in the storage device 14 through the database administration module 12 in the server device 10.

The database administration module 12 running on the server device 10 is intended to access, add, delete and edit the data records in the landmark building model database 15 and the landmark building information database 16 in the storage device 14. The building recognition module 13 running on the server device 10 is operative to accept input images from the end-user device 17 and to match these input images to the landmark building models stored in the landmark building model database 15, and it is operative to output recognition results to the end-user device 17. If the image is recognized as one of the landmark buildings in the landmark building database 15, the server device 10 outputs the related information of this landmark building to the end-user device 17 for display. There are two modules, an image processing module 18 and a recognition result display module 19, on the end-user device 17. The image processing module 18 is configured to accept images captured by the image capture device 20 of the landmark building 21, to process these images, and to output the processed results to the server device 10 for landmark building recognition. The recognition result display module 19 is configured to receive the recognition result and the information of the recognized landmark building from the server device 10 and to display the recognition result and an image of the recognized landmark building to an end user.

The image capture device 20 may be a digital still camera, a video camera, or a plurality of cameras that provides the server device 10 and the end-user device 17 a plurality of digital images of the landmark building 21 taken from different positions, optionally at different times. Images produced by the image capture device 20 may have pixel resolutions of 1824 pixels by 1216 pixels, for example, although other pixel resolution values may be substituted.

The server device 10 is conventionally a computer with processors, memory and program storage programmed to run the model learning module 11, the database administration module 12, and the building recognition module 13.

Figure 2:
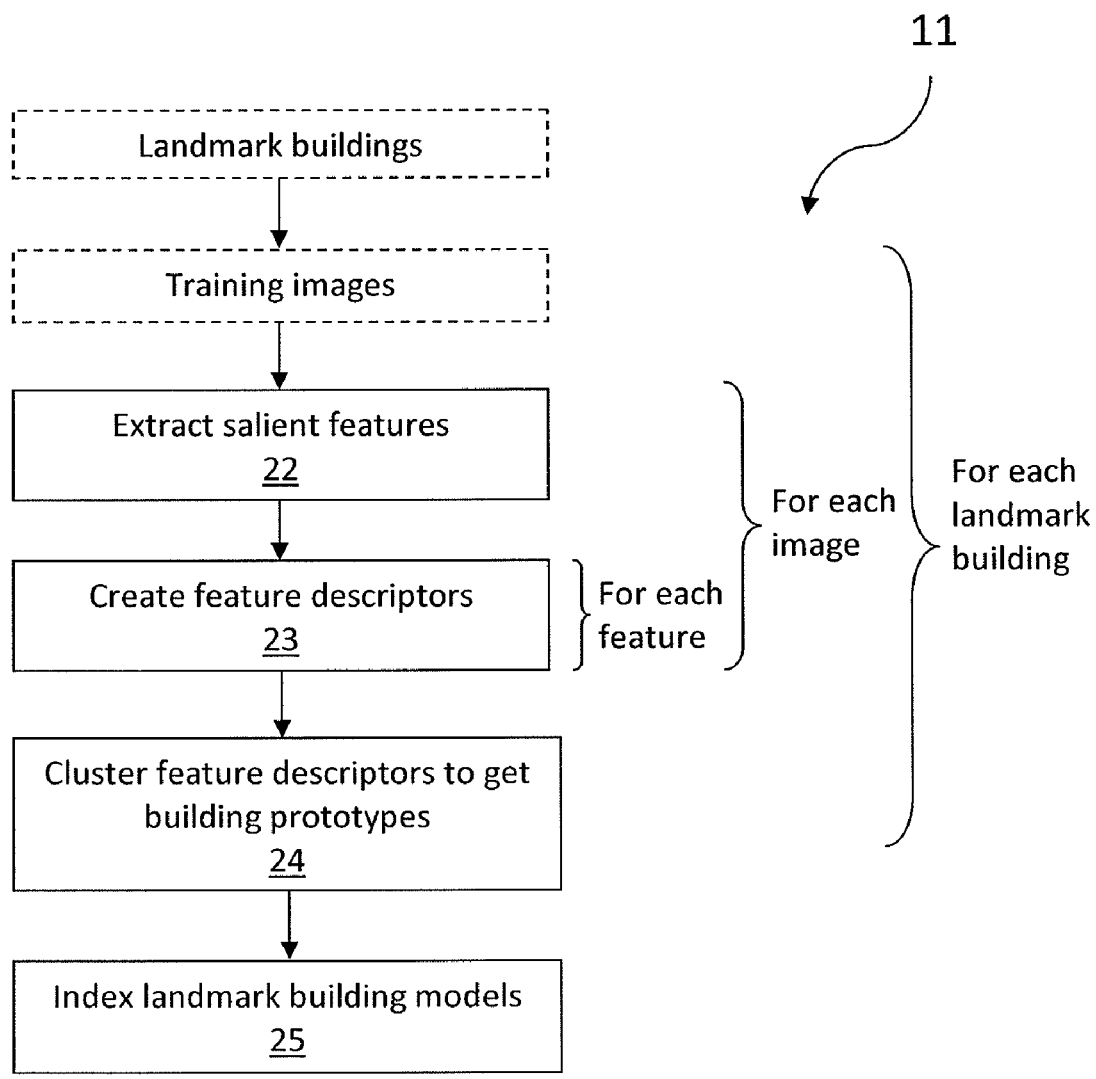
FIG. 2 is a flow chart of operation of a model learning module according to the invention.

Referring to FIG. 2, in operation, the model learning module 11 is operative to take each landmark building's training images captured from different positions and different viewpoints as input, extract the salient features from each image, and create binary bit strings as compact feature descriptors for each feature, then cluster these features according to their descriptors and geometric relationships to form a set of prototypes as the model description of the landmark building. The models of landmark buildings are then indexed and stored in the landmark building model database 15 in the storage device 14.

Figure 3:
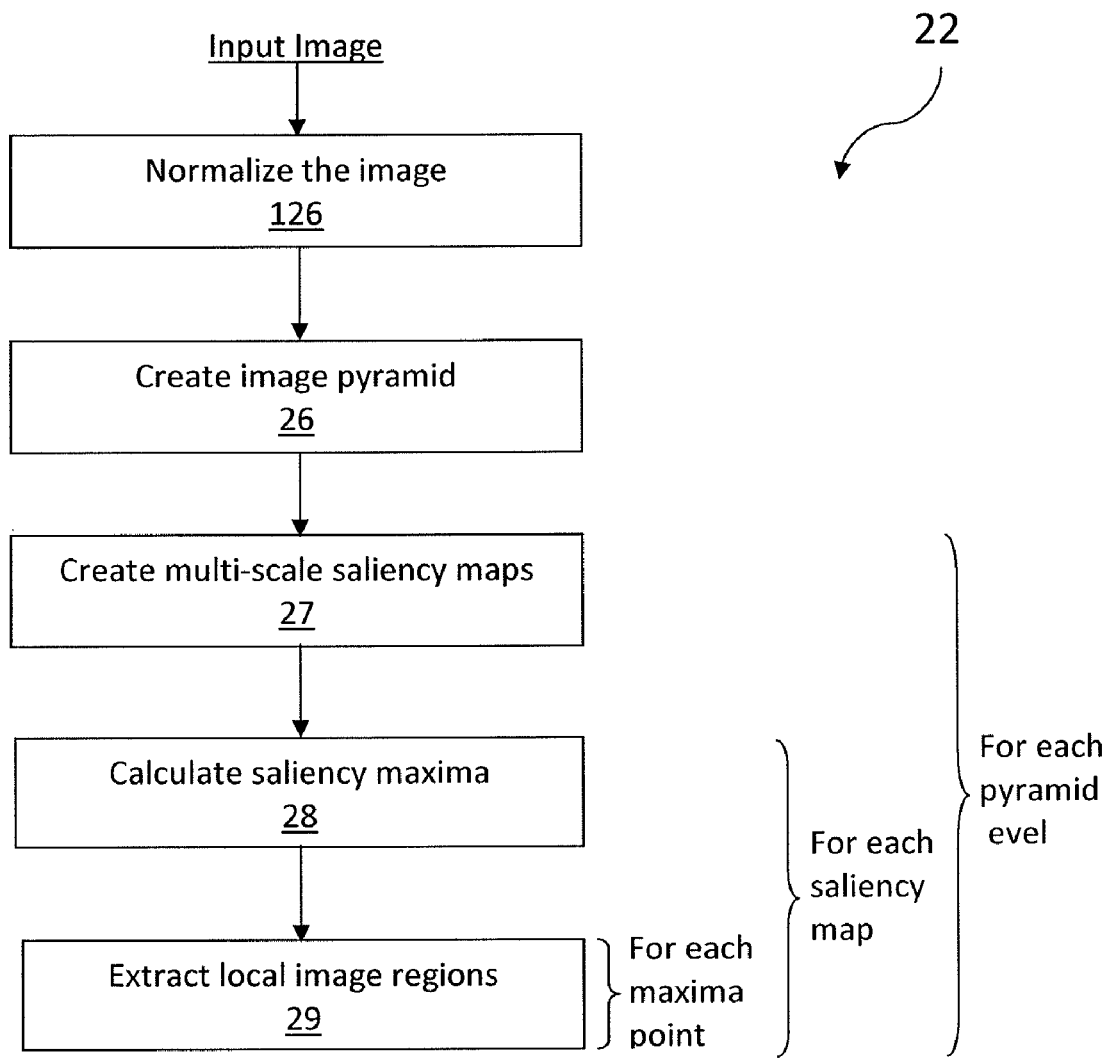
FIG. 3 is a flow chart of operation of a salient feature extraction process according to the invention.

Referring to FIG. 3, the salient feature extraction process 22 comprises taking an image as input, normalizing the input image to get a normalize image 126, creating an image pyramid of the image 26, creating a multi-scale saliency maps 27, calculating saliency maxima 28 and extracting local image regions 29. For each level in the pyramid, there is the calculation of the multi-scale saliency maps 28. For each pixel in a saliency map (not shown), its saliency value is compared to its neighbor pixels' saliency values in the same level and in the neighboring levels. If the pixel saliency value reaches a local maximal value, the local image region about this pixel with a size proportional to the scale of the map level is extracted from the image 29. The position of this pixel and the scale of the map level are recorded to describe the geometrical information of this salient feature.

Figure 4:
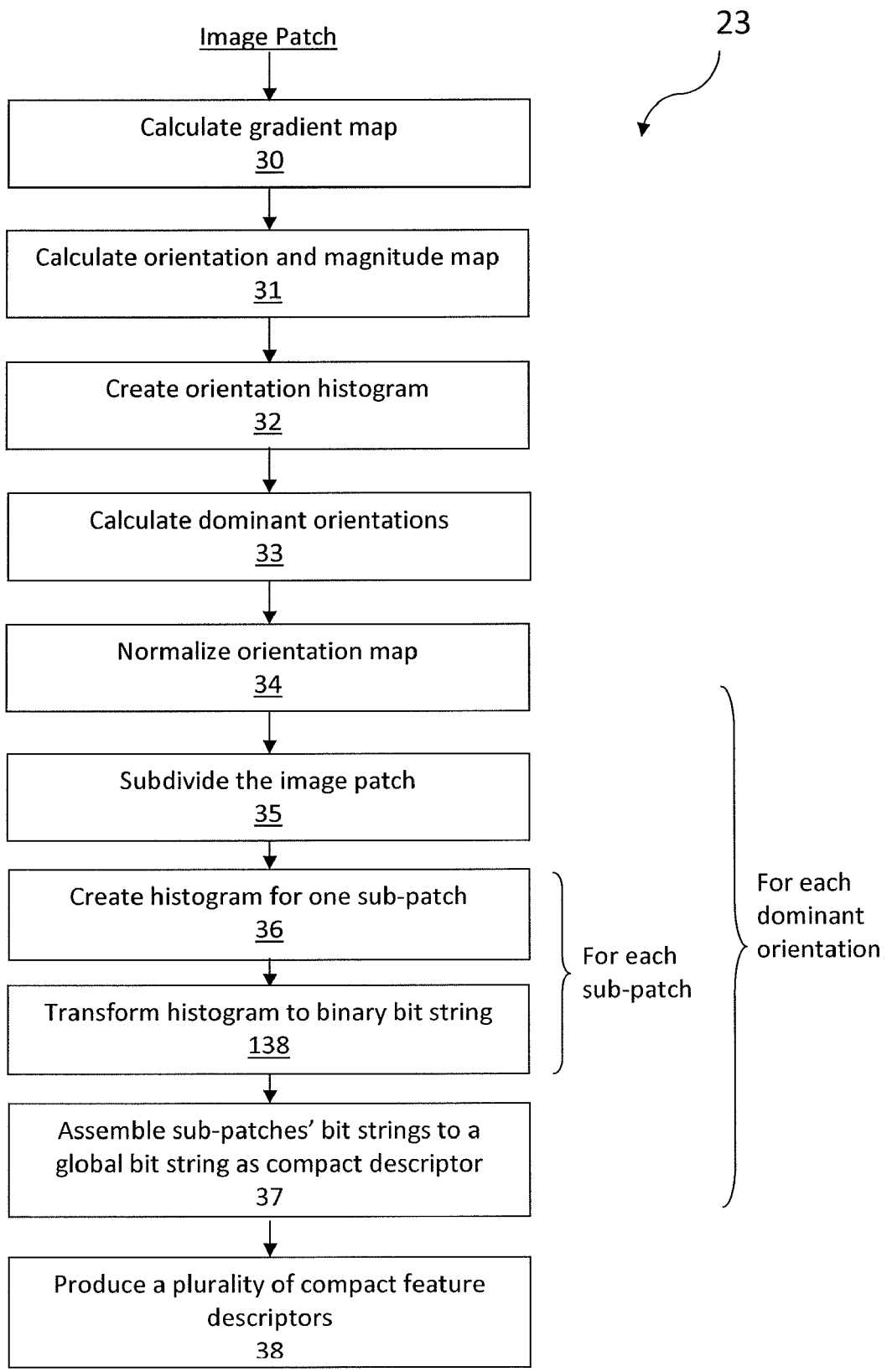
FIG. 4 is a flow chart of operation of a feature description process according to the invention.

Referring to FIG. 4, the feature description process 23 is illustrated wherein a local image patch outputted by the salient feature extraction process 22 is taken as its input. The process 23 first calculates the gradient field of the patch 30. Based on this gradient field, the orientation and magnitude of gradient vector of each point in the patch are computed 31. Then an orientation histogram is created by voting each point's orientation weighted by its magnitude and a Gaussian kernel with a deviation proportional to the size of the patch 32. The local maxima of the orientation histogram are calculated, and the orientations of these maxima points are selected as the dominant orientations for this patch 33. For each dominant orientation, the orientation map of this patch is normalized with respect to it 34, and this patch is subdivided into several overlapping sub-patches 35, and an orientation histogram is calculated for each sub-patch by weighting the magnitude value of each sub-patch by a Gaussian function with a deviation proportional to the size of each sub-patch 36. Then the histogram is transformed to a binary bit string 138. Then the bit strings of these sub-patches are assembled according a pre-defined order 38 to produce a compact descriptor for this feature 39.

Figure 5:
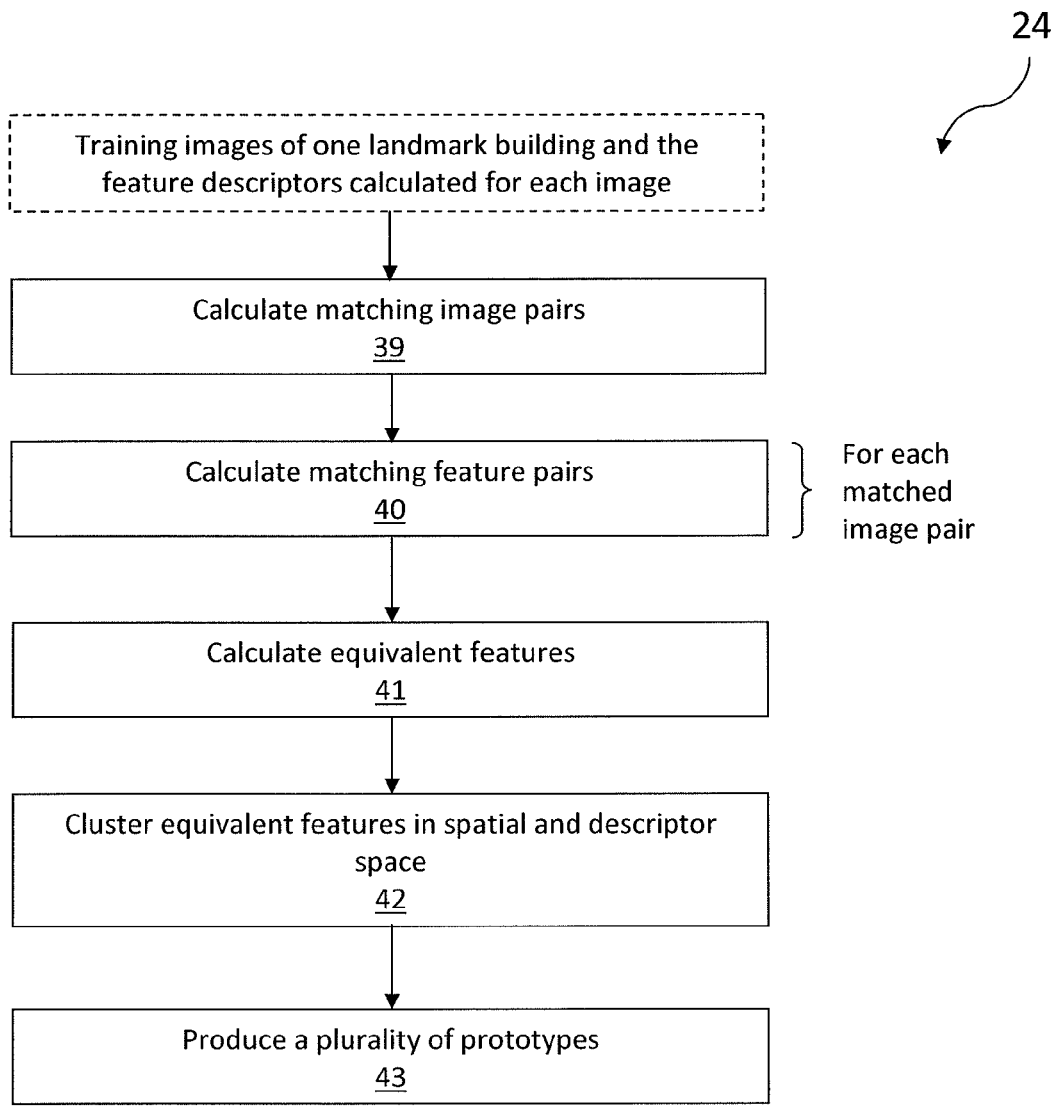
FIG. 5 is a flow chart of operation of a feature descriptors clustering process according to the invention.

Referring to FIG. 5, the feature descriptors clustering process 24 is illustrated. This process builds the model of one landmark building by taking the training images of this landmark building as input. The process 24 extracts the salient features from each training image and creates the descriptors for each feature. The matching image pairs are formed by matching the features' descriptors and their geometrical relationship 39. For each matching image pair, its corresponding matching feature pair is calculated 40. The matching relationship has transitional property, so the matching relationship between these features defines an equivalence relationship. By summarizing these matching feature pairs; the equivalent feature class of each feature can be calculated 41. Then each equivalent feature class is clustered to prototype the features in spatial and descriptor space 42. These prototype features and their geometrical relationship constitute the prototype model of one landmark building. A plurality of prototypes is produced 43, which are stored in the landmark building database for building recognition.

Figure 6:
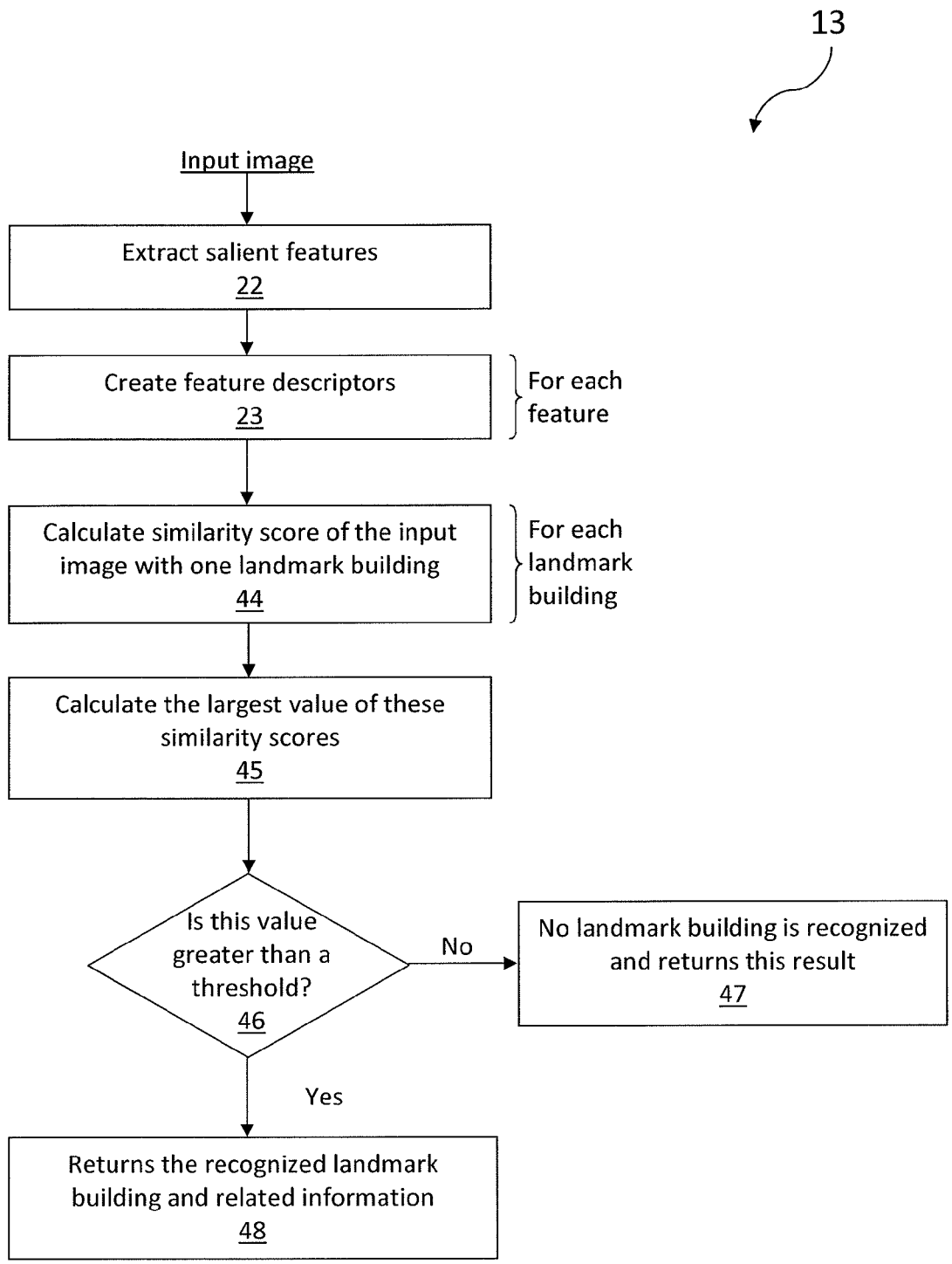
FIG. 6 is a flow chart of operation of a building recognition module according to the invention.

Referring to FIG. 6, the building recognition module 13 operation is disclosed wherein an image is taken as input. In operation, the module 13 extracts the salient features 22 from the input image and creates the feature descriptors 23 for each feature. Then these extracted salient features 23 and the geometric relationship are matched to the landmark building models stored in the landmark building database. For each model of a landmark building, the similarity score of the input image and the landmark building model is calculated. Then the largest value of these similarity scores is calculated the corresponding landmark building is recorded 44. If the largest value is greater than a threshold set by the system (or its operator) 46, the input image is recognized as the corresponding landmark building. This recognition result is returned together with the related information of this landmark building extracted from the landmark building information database 48. Otherwise, the result returned is that no landmark building is recognized 47.

Figure 7:
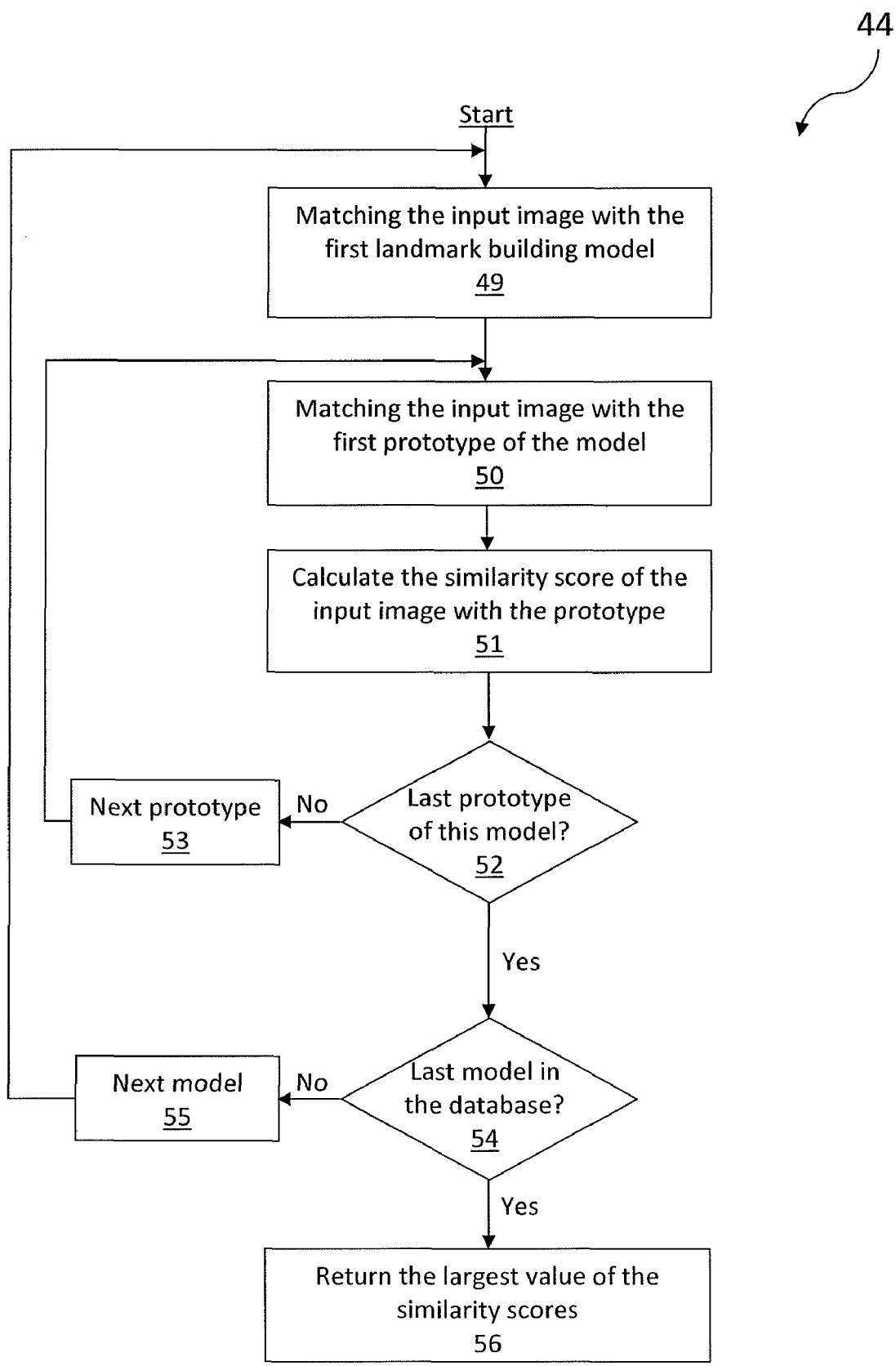
FIG. 7 is a flow chart illustrating a score matching process according to the invention.

Referring to FIG. 7, the similarity score calculation module 44 operation is illustrated. The module 44 is operative to calculate the similarity score of the input image with the stored landmark building models by repeatedly matching the input image with the prototypes of each landmark building, returning the largest similarity score value as the similarity score of the input image with the said landmark building 56. The landmark building with the largest similarity score value greater than a threshold is returned as the recognized landmark building, and the related information of the recognized landmark building is retrieved from the landmark building information database for displaying. This module 44 does matching with the first land mark building model 49, than matching with the first prototype of the model 50, then calculates the matching score 51 and tests to see if this is the last prototype of the model in test 52. If not the module iterates to the next prototype 53. Otherwise it checks to see if it the last model in the database 54. If it is not, it iterates to the next model 55. Otherwise it returns the largest similarity score 56.

Figure 8:
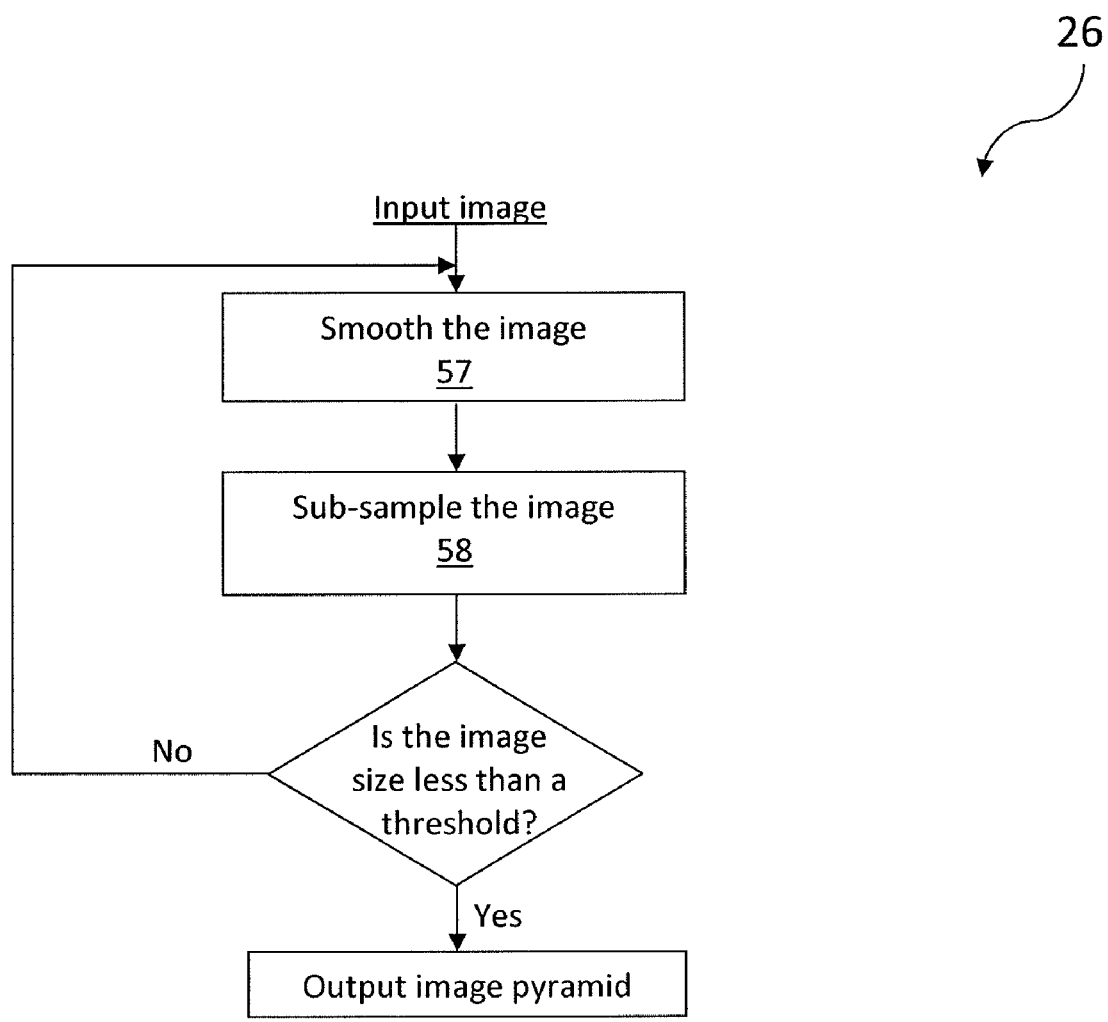
FIG. 8 is a flow chart for building an image pyramid according to the invention.

Referring to FIG. 8, there is shown a flow chart for the image pyramid building module 26. The module 26 is operative to produce an image pyramid for an input image by repeatedly smoothing and sub-sampling the input image until the size of the result image level less than a threshold. Taking the input image, there is first a smoothing process 57, then the smoothed image is down sampled 58 if the size of the image is sufficiently small, and then the image pyramid is output to create multi-scale saliency maps 27.

Figure 9:
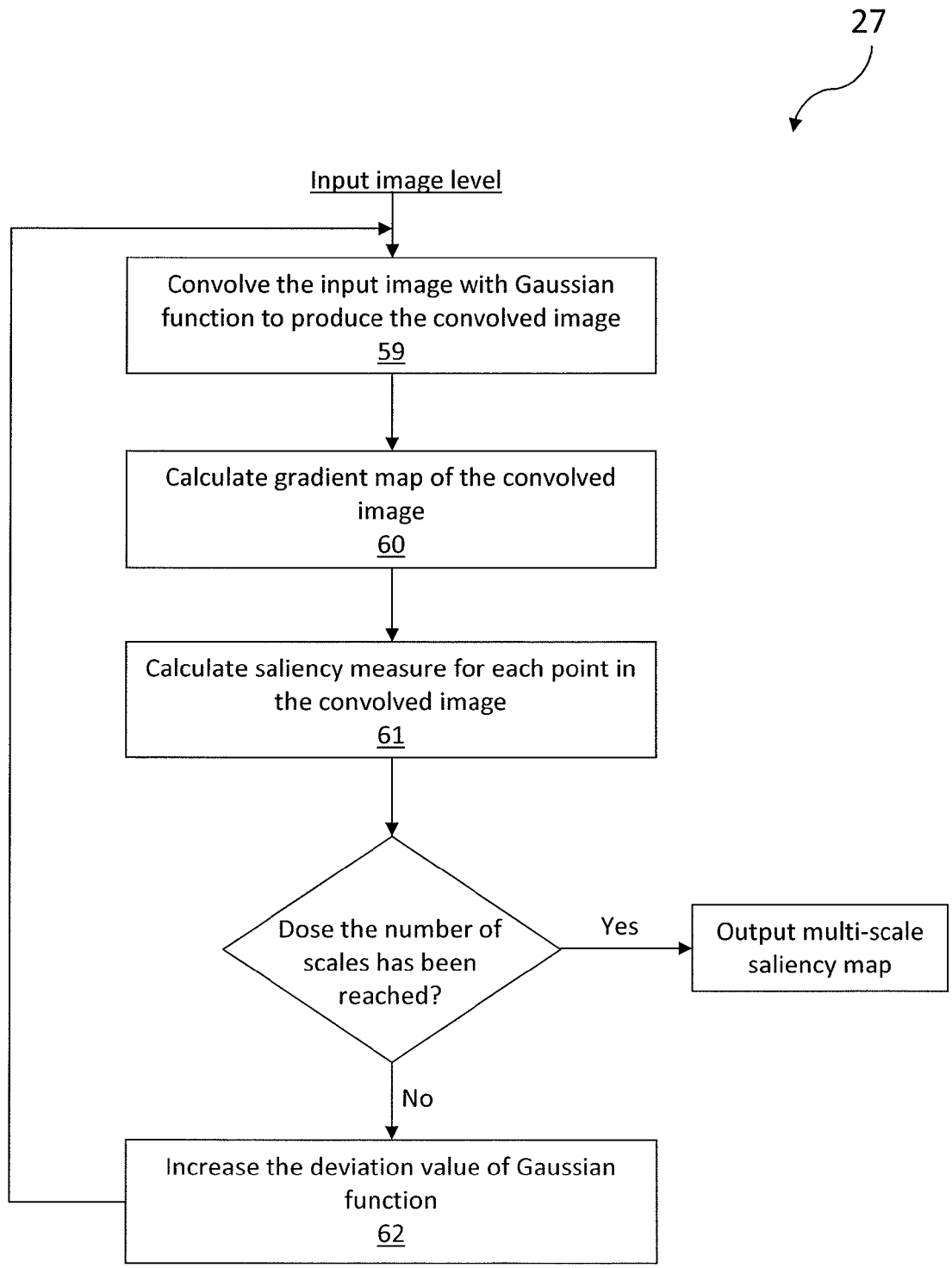
FIG. 9 is a flow chart for producing multi-scale saliency maps for one input image level according to the invention.

Referring to FIG. 9, multi-scale saliency maps for one input image level are produced 27. This is done by convolving the image level with a Gaussian function 59, then calculating the gradient values for each pixel in the smoothed image level 60, then calculating the saliency map of this smoothed image level by calculating the saliency measure for each point in the image 61. If the number of scales has not been reached, then the deviation of the Gaussian function is increased 62, and the process to produce the next scale level saliency map is repeated until reaching the preselected scale number, whereupon the multi-scale saliency map is output for the maxima calculation 28 (FIG. 10).

Figure 10:
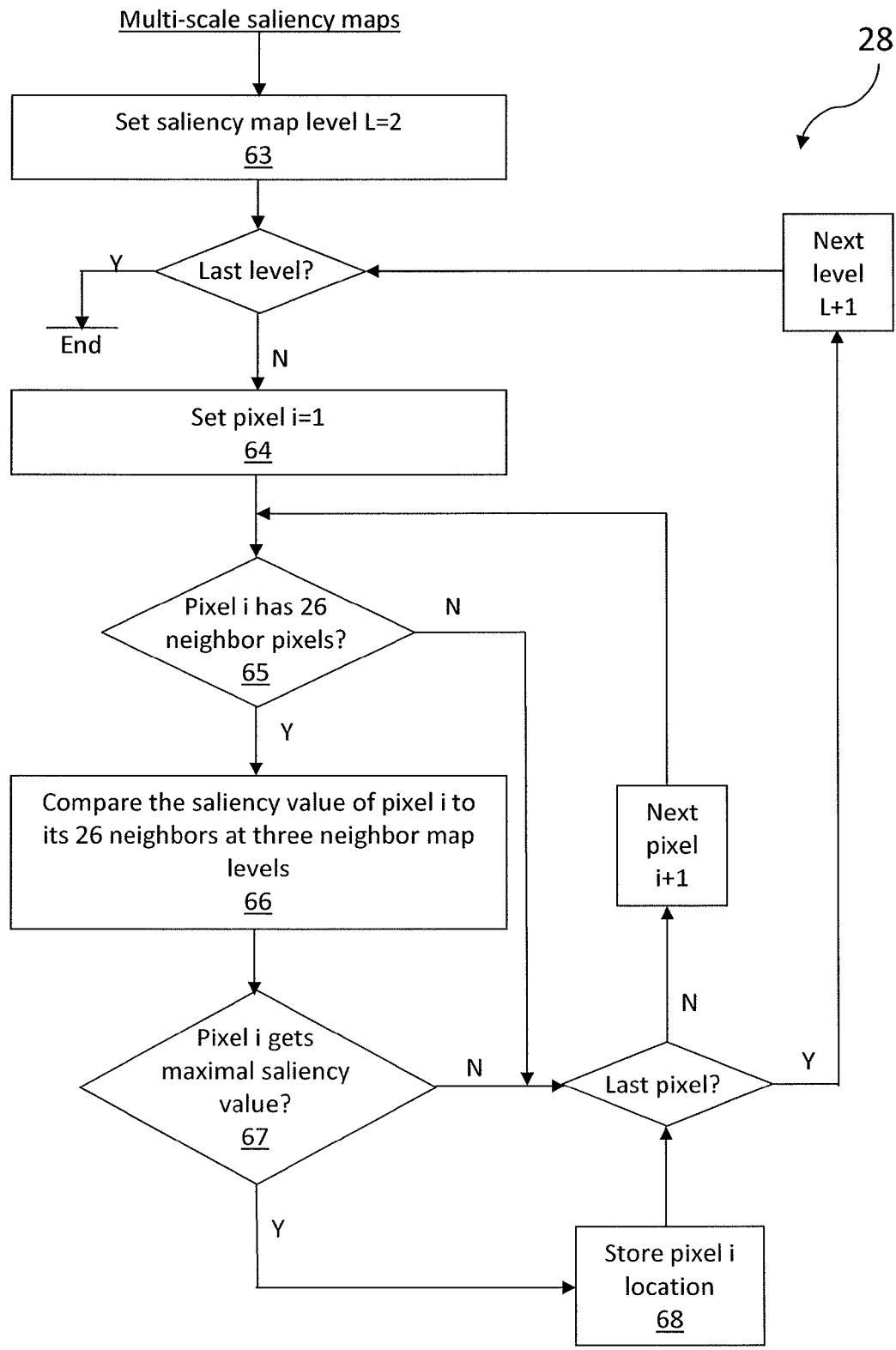
FIG. 10 is a flow chart for calculating saliency maxima according to the invention.

Referring to FIG. 10, the maxima pixels of the multi-scale saliency maps are calculated 28 by comparing the saliency value of one pixel with twenty-six neighbor pixels at the three neighbor saliency map levels 66. If the tested pixel has saliency values greater than the saliency values of the twenty-six neighbor pixels, the tested pixel is selected as the feature point, and its location and scale level are recorded for description 68.

As some of the technical details may not be evident, the following description is provided for selected elements.

[1] Extract Local Salient Features from One Image

Figure 11:
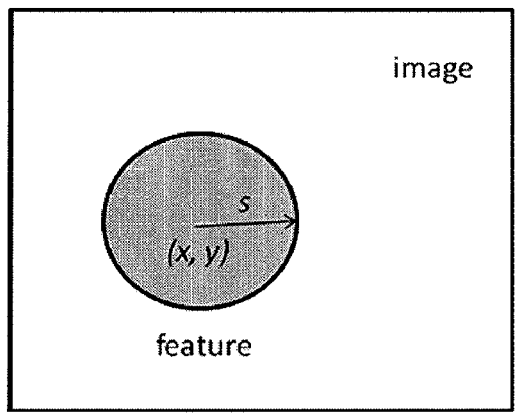
FIG. 11 is a diagram to show one local salient feature extracted from an image.

As shown in FIG. 11, the local salient feature extracted from an image can be represented as a circular region R, and is described by its spatial location (x, y), its scale value s. The spatial location (x, y) of the local salient feature is the x- and y-coordinates of the center of the circular region. The scale value s of the feature is proportional to the radius of the circular region.

For an input image I, if the image is a color image, convert it to a grayscale image, and map the intensity value from [0, 255] to [0.0, 1.0]. If the size of the image is H×W, where H is image height and W is image width, calculate the maximal value of H and W as S=max(H, W), where operator max(•, •) is used to calculate the maximal value of two numbers. If S>512, normalize this image to be an image I' with size H'×W', where H'=[H×512/S], and W'=[W×512/S]. The operator [•] is used to round a number to its nearest integer. Else, the image remains unchanged, so H'=H, and W'=W. After the normalization step, the image I' has size H'×W', so calculate the minimal value of H' and W' as S'=min(H', W'), where operator min(•, •) is used to calculate the minimal value of two numbers. Then construct an image pyramid by repeatedly smoothing and sub-sampling the image I' by a scale factor k=1.26 until the width or height of the result image is less than 32. That means set $I_1$=I', and smooth $I_1$ by a Gaussian function with deviation σ=1.26 to get a smoothed image $I'_1$, and then sub-sampling $I'_1$ to get the image $I_2$ with size $H_2×W_2$, where $H_2$=[$H_1$/1.26], $W_2$=[$W_1$/1.26], and $H_1$ and $W_1$ are the height and width of the image $I_1$. If $H_2$ and $W_2$ are greater than 32, repeat the above process to the image $I_2$ to get the image $I_3$ with size $H_3×W_3$, where $H_3$=[$H_2$/1.26] and $W_3$=[$W_2$/1.26].

The above process is repeated until obtaining the image $I_m$ with size $H_m×W_m$, and min($H_m$, $W_m$)≦32. Then obtain an image pyramid with image levels $I_1$, ..., $I_m$, where m=⌊log(S'/32)/log(1.26)⌋, where the operator ⌊•⌋ is used to calculate the nearest lower integer of one number. For two nearest image levels $I_l$ with size $H_l×W_l$ and $I_{l+1}$ with size $H_{l+1}×W_{l+1}$ of this image pyramid, $H_{l+1}$=[$H_{l+1}$/1.26] and $W_{l+1}$=[$W_{l+1}$/1.26].

Figure 12:
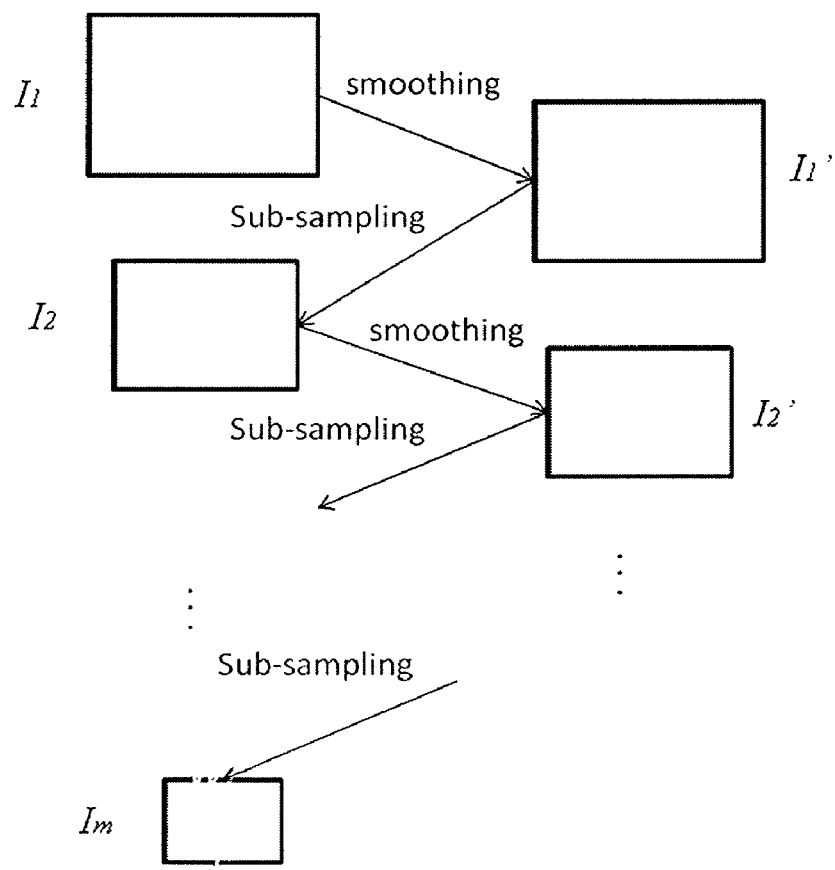
FIG. 12 is a diagram for constructing an image pyramid with m image levels from an image $I_1$.

FIG. 12 illustrates the process of constructing the image pyramid from $I_1$ to $I_m$. For an image level $I_i$ (1≦i≦m) of the image pyramid, create three saliency maps $M_{i1}$, $M_{i2}$, and $M_{i3}$ by the following process:

To calculate the saliency map $M_{i1}$, first calculate the gradient fields $G_{i1x}$ and $G_{i1y}$, of the image $I_i$ by convolving $I_i$ with Gaussian gradient functions $g_x$ and $g_y$ with deviation $σ_{1D}$=1.6, where $$g_x = \frac{-x}{2\pi\sigma^2}\exp\left(-\frac{x^2+y^2}{2\sigma^2}\right) \text{ and } g_y = \frac{-y}{2\pi\sigma^4}\exp\left(-\frac{x^2+y^2}{2\sigma^2}\right).$$

Figure 13:
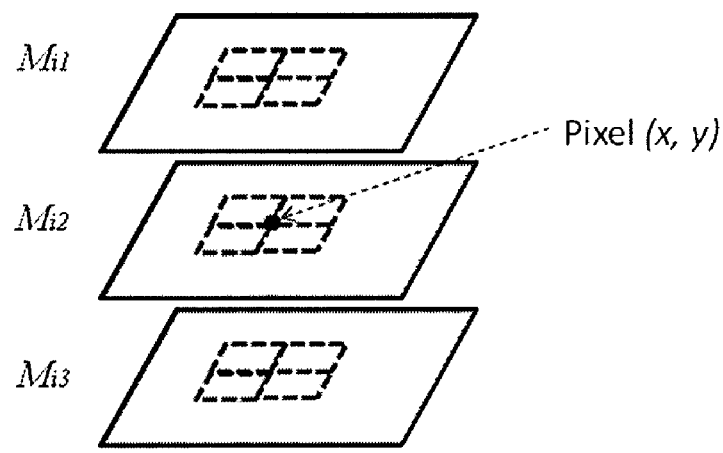
FIG. 13 is a diagram illustrating the 26 neighbor pixels in three saliency maps $M_{i1}$, $M_{i2}$ and $M_{i3}$ of pixel (x, y) in saliency map $M_{i2}$.

Then for each pixel (x, y) in the image level $I_i$, calculate $G_{i1xx}(x, y)=G_{i1x}(x, y)^2$, $G_{i1yy}=G_{i1y}=(x, y)^2$, and $G_{i1xy}=G_{i1x}(x, y)×G_{i1y}(x, y)$. Then convolve $G_{i1xx}$, $G_{i1yy}$, and $G_{i1xy}$ by a Gaussian function with deviation $σ_{1f}$=1.26 to get $G'_{i1xx}$, $G'_{i1yy}$ and $G'_{i1xy}$ respectively. Then for each pixel (x, y), calculate its saliency value $M_{i1}(x, y)=G'_{i1xx}×G'_{i1yy}-G'_{i1xy}×G'_{i1xy}-0.06×(G'_{i1xx}+G'_{i1yy})^2$ to get the saliency map $M_{i1}$. Following the same procedure, obtain the saliency map $M_{i2}$ by setting $σ_{2D}$=2.02 and $σ_{2f}$=1.59. Similarly, obtain the saliency map $M_{i3}$ by setting $σ_{3D}$=2.55 and $σ_{3f}$=2.00. For each pixel (x, y) in the saliency map $M_{i2}$, it has 26 neighbor pixels in the three saliency maps $M_{i1}$, $M_{i2}$, and $M_{i3}$ as in FIG. 13. Compare the saliency value $M_{i2}(x, y)$ to its 26 neighbor pixels' saliency values:

$M_{i1}(x-1, y-1)$, $M_{i1}(x, y-1)$, $M_{i1}(x+1, y-1)$, $M_{i1}(x-1, y)$, $M_{i1}(x, y)$, $M_{i1}(x+1, y)$, $M_{i1}(x-1, y+1)$, $M_{i1}(x, y+1)$, $M_{i1}(x+1, y+1)$, $M_{i2}(x-1, y-1)$, $M_{i2}(x, y-1)$, $M_{i2}(x+1, y-1)$, $M_{i2}(x-1, y)$, $M_{i2}(x+1, y)$, $M_{i2}(x-1, y+1)$, $M_{i2}(x, y+1)$, $M_{i2}(x+1, y+1)$, $M_{i3}(x-1, y-1)$, $M_{i3}(x, y-1)$, $M_{i3}(x+1, y-1)$, $M_{i3}(x-1, y)$, $M_{i3}(x, y)$, $M_{i3}(x+1, y)$, $M_{i3}(x-1, y+1)$, $M_{i3}(x, y+1)$, $M_{i3}(x+1, y+1)$.

If the saliency value $M_{i2}(x, y)$ is greater than all the saliency values of its 26 neighbors and the saliency value is greater than $e^{-13.8}$ and x>10 and y>10, a local image region R with size 31×31 is extracted from the image level $I_i$ around the pixel (x, y) as a local salient feature. The location (x, y) is mapped to the original image I as (x×$1.26^{i-1}$, y×$1.26^{i-1}$) as the location of the local salient feature, and the scale value of the local salient feature is s=$1.26^{i-1}$. For each image level $I_i$, its gradient fields $G_{i1x}$ and $G_{i1y}$ have been calculated, and then one can calculate the gradient direction field D, and the gradient magnitude field A, according to the following formulas:

$$D_i(x, y) = \tan^{-1}\left(\frac{G_{i1y}(x, y)}{G_{i1x}(x, y)}\right) \text{ and}$$

$$A_i(x, y) = \sqrt{G_{i1x}(x, y)^2 + G_{i1y}(x, y)^2}.$$

For the local salient feature with location (x, y) in the image level $I_i$, extract its gradient direction field $R_D$ and gradient magnitude field $R_A$ with size 31×31 from D, and A, around the pixel (x, y). Then calculate dominant orientations and corresponding descriptors for this local salient feature according to the method explained in the following text.

[2] Create Descriptors for One Local Salient Feature

For one local salient feature F with location (x, y) and scale value s, there is a corresponding local image region R with size 31×31 extracted from an image level $I_i$, (1≦i≦m). There is also extracted its corresponding 31×31 gradient direction field $R_D$ with direction angle from 0 to 2π and its gradient magnitude field $R_A$.

[2.1] Calculate Dominant Orientations for the Local Salient Feature

First, weight the gradient magnitude field $R_A$ by a Gaussian function with deviation σ=5 to get the weighted gradient magnitude field $R'_A$. Then create an orientation histogram $H_O$ with 36 bins from $h_0$ to $h_{35}$. The orientation bin $$h_i = \frac{i}{18}\pi$$

(0≦i≦35). For each pixel (x, y) in the local image region R, its gradient direction is $R_D(x, y)$ and its weighted gradient magnitude is $R'_A(x, y)$. If 0<$R_D(x, y)$≦1.941π this pixel votes to two neighbor bins $h_i$ and $h_{i+1}$, where i=⌊18×$R_D(x, y)$/π⌋. This pixel votes to bin $h_i$ with the value |$R_D(x, y)-h_i$|×$R'_A(x, y)$, and votes to bin $h_{i+1}$ with the value |$R_D(x, y)-h_{i+1}$|×$R'_A(x, y)$. If 1.94π<$R_D(x, y)$≦2π, this pixel votes to neighbor bins $h_{35}$ and $h_0$. It votes to bin $h_{35}$ with the value |$R_D(x, y)-h_{35}$|×$R_A(x, y)$, and votes to $h_0$ with the value |2π-$R_D(x, y)$|×$R'_A(x, y)$. After each pixel in the feature region has voted the orientation bins, each orientation bin $h_i$ has vote value $v_i$ (0≦i≦35). So the orientation histogram $H_O$ has value ($v_0$, $v_1$, ..., $v_{35}$), where it is assumed $v_0$ and $v_{35}$ are neighbor bins. Calculate the largest value of the $v_0$, ..., $v_{35}$ as $v_{max}=\max_{k=0}^{35} v_k$. For three neighbor bins with values $v_{k-1}$, $v_k$, $v_{k+1}$, if $v_k$>$v_{k-1}$ and $v_k$>$v_{k+1}$, and $v_k$>0.8*$v_{max}$, select $h_k$ as one dominant orientation of this local salient feature.

[2.2] Create Descriptors for One Local Salient Feature

Figure 14:
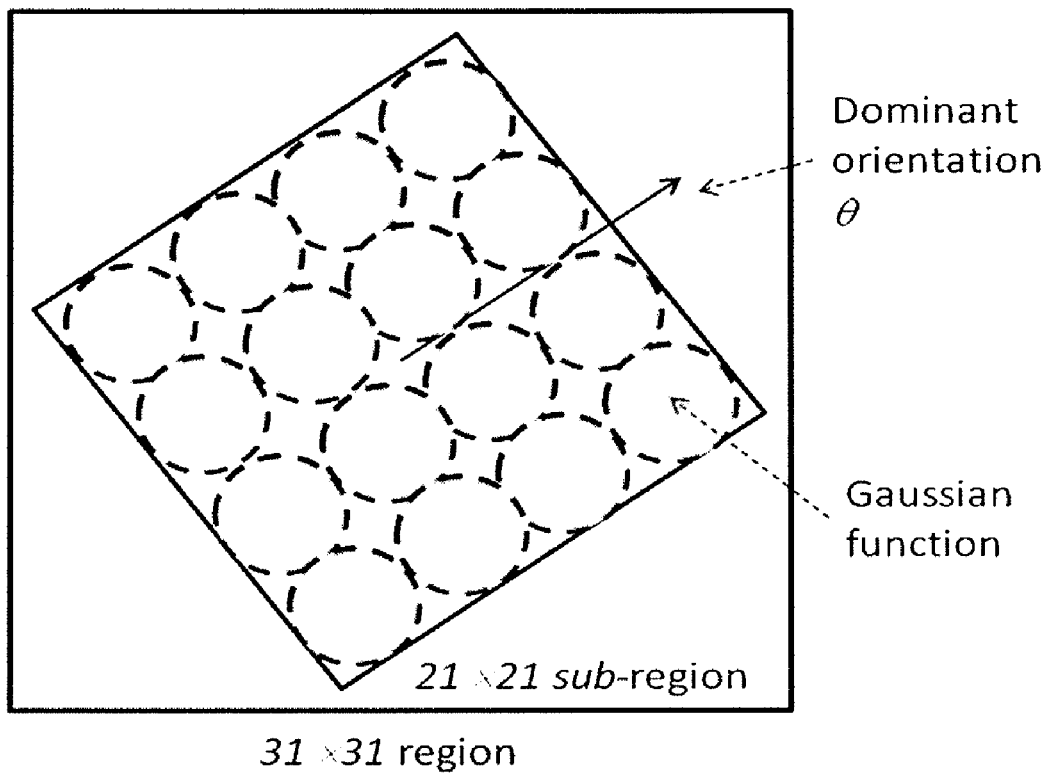
FIG. 14 is a diagram illustrating extraction of a 21×21 sub-region from a 31×31 region.

Each local salient feature is represented by a 31×31 local image region R, and its gradient orientation field is $R_D$ and its gradient magnitude filed is $R_A$. For one dominant orientation θ, first normalize the direction field from $R_D$ to $R_D$-θ and convert them to the angle range from 0 to 2π to get the normalized direction field $R'_D$, and then extract a sub-region with size 21×21 from the 31×31 image region as in FIG. 14. The coordinate frame of the 21×21 sub-region is gotten by rotating the x-coordinate axis of the 31×31 region to the dominant orientation o. Then one produces a 16 orientation sub-histogram $H_k$ (k=1, ..., 16) according to the following process: first subdivide the 21×21 sub-region to 16 overlapped sub-regions by weighing the gradient magnitude field $R_A$ by 16 Gaussian function $g_i$ (i=1, ..., 16) with deviation value σ=1.26 located at 16 different pixels on the 21×21 sub-region. If the center of the region R is denoted as (0, 0), the locations of the 16 Gaussian functions are:

(2.5 cos θ−2.5 sin θ, 2.5 sin θ+2.5 cos θ), (7.5 cos θ−2.5 sin θ, 7.5 sin θ+2.5 cos θ),
(2.5 cos θ−7.5 sin θ, 2.5 sin θ+7.5 cos θ), (7.5 cos θ−7.5 sin θ, 7.5 sin θ+7.5 cos θ),
(−2.5 cos θ−2.5 sin θ, −2.5 sin θ+2.5 cos θ), (−7.5 cos θ−2.5 sin θ, −7.5 sin θ+2.5 cos θ),
(−2.5 cos θ−7.5 sin θ, −2.5 sin θ+7.5 cos θ), (−7.5 cos θ−7.5 sin θ, −7.5 sin θ+7.5 cos θ),
(−2.5 cos θ+2.5 sin θ, −2.5 sin θ−2.5 cos θ), (−7.5 cos θ+2.5 sin θ, −7.5 sin θ−2.5 cos θ),
(−2.5 cos θ+7.5 sin θ, −2.5 sin θ−7.5 cos θ), (−7.5 cos θ+7.5 sin θ, −7.5 sin θ−7.5 cos θ),
(2.5 cos θ+2.5 sin θ, 2.5 sin θ−2.5 cos θ), (7.5 cos θ+2.5 sin θ, 7.5 sin θ−2.5 cos θ),
(2.5 cos θ+7.5 sin θ, 2.5 sin θ−7.5 cos θ), (7.5 cos θ+7.5 sin θ, 7.5 sin θ−7.5 cos θ).

Each sub-histogram $H_k$ (k=1, ..., 16) has eight orientation bins from $h_0$ to $h_7$, and $$h_i = \frac{i}{4}\pi$$

(i=1, ..., 8). To calculate the k-th (k=1, ..., 16) sub-histogram $H_k$ with 8 orientation bins $$h_{ki} = \frac{i}{4}\pi,$$

first weigh the gradient magnitude field $R_A$ with the Gaussian function $g_k$ to get the weighed gradient magnitude $R'_A$, then for each pixel (x, y) in the region with normalized gradient orientation $R'_D$ (x, y), if $0 \leq R'_D(x, y) < 1.5\pi$, it votes to two neighbor bins $h_{ki}$ and $h_{k(i+1)}$, where $i = \lfloor 4 \times R'_D(x, y)/\pi \rfloor$, with vote values $|R'_D(x, y) - h_{ki}| \times R'_A(x, y)$ and $|R'_D(x, y) - h_{k(i+1)}| \times R'_A(x, y)$ respectively. If $1.5\pi \leq R'_D(x, y) < 2\pi$, it votes to bins $h_{k7}$ and $h_{k0}$ with vote values $|R'_D(x, y) - h_{k7}| \times R'_A(x, y)$ and $|2\pi - R'_D(x, y)| \times R'_A(x, y)$. After each pixel in the 21×21 sub-region, one can obtain the sub-histogram $H_k = (v_{k,0}, v_{k,1}, \ldots, v_{k,7})$. After all 16 sub-histogram have been calculated, assemble these sub-histograms $H_k$ (k=1, ..., 16) to obtain one global histogram as $H_d = (H_1, H_2, \ldots, H_{16}) = (v_{1,0}, v_{1,1}, \ldots, v_{1,7}, v_{2,0}, v_{2,1}, \ldots, v_{2,7}, v_{3,0}, \ldots, v_{15,7}, v_{16,0}, v_{16,1}, \ldots, v_{16,7})$, then normalize this global histogram by converting $v_{k,i}$ to $$d_{k,i} = \frac{v_{k,i}}{\sum_{m=1}^{16} \sum_{n=0}^{17} v_{m,n}}$$

to obtain the final histogram as the descriptor $D=(d_{1,0}, \ldots, d_{1,7}, d_{2,0}, \ldots, d_{2,7}, d_{3,0}, \ldots, d_{15,7}, d_{16,0}, \ldots, d_{16,7})$.

[3] Transform One Feature Descriptors to a Binary Bit String

For one descriptor $D=(d_{1,0}, \ldots, d_{1,7}, d_{2,0}, \ldots, d_{2,7}, d_{3,0}, \ldots, d_{15,7}, d_{16,0}, \ldots, d_{16,7})$ of one local salient feature, apply the following process to d to get a binary string $d_c$ to accelerate the feature matching process. First decompose d to 16 vectors $d_i=(d_{i,0}, d_{i,1}, \ldots, d_{i,7})$, and then expand $d_i$ to $d'_i=(d_{i,7}, d_{i,0}, d_{i,1}, \ldots, d_{i,7}, d_{i,0})$. For two neighbor elements $(e_k, e_{k+1})$ of vector $d'_i$, Calculate a state $S(e_k, e_{k+1})$ $(1 \leq k \leq 9)$ to one of three states $s_0$, $s_+$, and $s_-$ according to the following formula:

$$S(e_k, e_{k+1}) = \begin{cases} s_=, & \text{if } \frac{|e_k - e_{k+1}|}{h} < 0.4 \\ s_>, & \text{if } \frac{|e_k - e_{k+1}|}{h} \geq 0.4 \text{ and } e_k > e_{k+1} \\ s_<, & \text{if } \frac{|e_k - e_{k+1}|}{h} \geq 0.4 \text{ and } e_k < e_{k+1} \end{cases}$$

Figure 15:
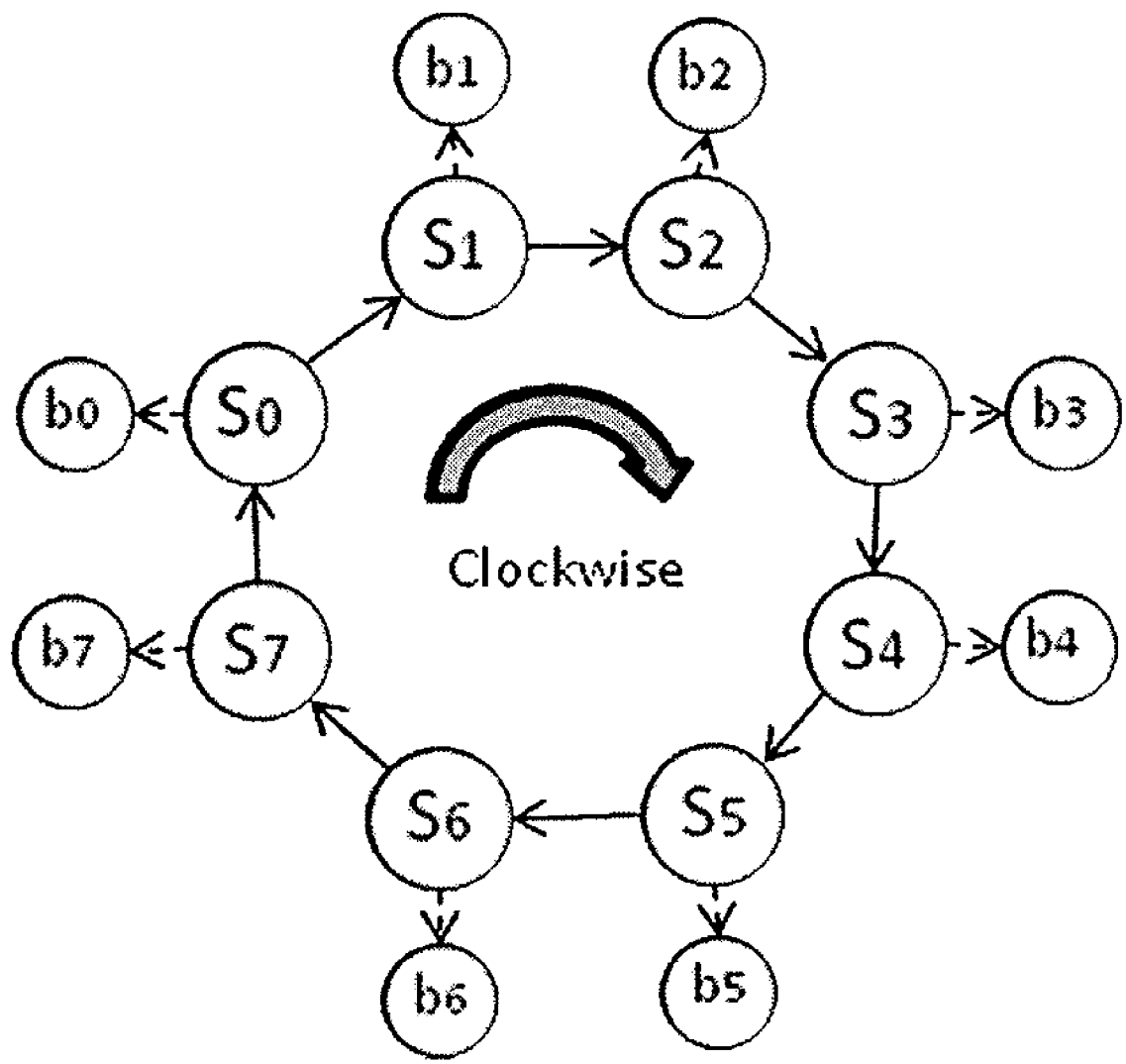
FIG. 15 is a diagram illustrating the neighbor relationship of a state string S and a corresponding bit string B.

Then calculate a state string $S=s_0 s_1 s_2 s_3 s_4 s_5 s_6 s_7$ for vector $d'_i$. The state string S is considered as a circular string as in FIG. 15, where $s_7$ and $s_0$ are linked as neighbor elements as FIG. 15 shows. Then scan the state string S clockwise to find a state sub-string begin with state $s_<$, and end with state $s_>$, and the elements between $s_<$ and $s_>$ are 0 or several elements with state $s_=$, such as the state sub-strings like $s_< s_>$, $s_< s_= s_>$, $s_< s_= s_= s_>$ are example sub-strings satisfy the condition. Create an 8-length bit string $B=b_0 b_1 b_2 b_3 b_4 b_5 b_6 b_7$, and set all $b_i (0 \leq i \leq 7)$ to be 0. If a state sub-string begin with $s_m = s_<$ and end with $s_n$ satisfying the above condition, that means $s_m = s_<$ and $s_n = s_>$, and the elements between $s_m$ and $s_n$ clockwise are all have the state $s_=$. Then set the corresponding bits between $b_m$, and $b_n$ clockwise to 1, and $b_n$ is also set to be 1. Following the above procedure, transform vector $d_i=(d_{i,0}, d_{i,1}, d_{i,2}, d_{i,3}, d_{i,4}, d_{i,5}, d_{i,6}, d_{i,7})$, to 8-length bit string $B_i=b_{i,0} b_{i,1} b_{i,2} b_{i,3} b_{i,4} b_{i,5} b_{i,6} b_{i,7}$ $(1 \leq i \leq 16)$. Finally ensemble these bit string $B_i$ together to get the 128-bits compact descriptor $B=B_1 B_2 \ldots B_{16}$.

[4] Calculate Hamming Distance for Two Local Salient Features

Local salient features extracted from an input image I are represented by records $F=\{f_1, f_2, \ldots, f_N\}$. Each record $f_i$ $(1 \leq i \leq N)$ stores the spatial location $(x_i, y_i)$, the scale value $s_i$, one dominant orientation $\theta_i$, and the 128-bit compact descriptor $B_i$ of one salient feature, that is $f_i=(x_i, y_i, s_i, \theta_i, B_i)$, where $B_i=b_{i,1} b_{i,2} \ldots, b_{i,128}$. For two feature records $f_1=(x_1, y_1, s_1, \theta_1, B_1)$ and $f_2=(x_2, y_2, s_2, \theta_2, B_2)$, measure their difference by Hamming distance $H(B_1, B_2)$ between $B_1$ and $B_2$. To calculate the Hamming distance between $B_1$ and $B_2$ by first applying XOR operation to these two 128-length bit strings $B_1$ and $B_2$ to get a 128-length bit string $B \otimes = B_1 \otimes B_2 = (b_{1,1} \otimes b_{2,1})(b_{1,2} \otimes b_{2,2}) \ldots (b_{1,128} \otimes b_{2,128})$, where ⊗ denotes the XOR operation. The Hamming distance is then calculated by counting the number of bits with value 1 in the result bit string $B \otimes$. Represent the 128-length bit strings $B_1$ and $B_2$ as 4 32-bit integers for bitwise XOR operation. Then represent the result 128-length bit string $B \otimes$ as 16 8-bit unsigned integer as $B \otimes = J_1 J_2 \ldots J_{16}$, where $J_i (1 \leq i \leq 16)$ is an 8-bit unsigned integer. Store an array N with 256 integer elements to store the number of bits with value 1 in a 8-bit unsigned integer. That is, N[J]=the number of bits with value in J, where J is a 8-bit unsigned integer. For example N[0]=0, N[3]=2, and N[255]=8. So the Hamming distance of $B_1$ and $B_2$ is calculated as $H(B_1, B_2) = \sum_{i=1}^{16} N[J_i]$.

[5] Calculate Similarity Score for Two Sets of Salient Features

There are two sets of salient features, one with M local salient features as $F_1=\{f_{11}, f_{12}, \ldots, f_{1M}\}$ and the other with N salient features as $F_2=\{f_{21}, f_{22}, \ldots, f_{2N}\}$. For each feature $f_{1i} \epsilon F_1$ ($1 \leq i \leq M$), calculate the Hamming distances of $f_{1i}$ with all features in $F_2$ to find the 5 nearest salient feature in $F_2$. For these 5 nearest features, select the Hamming distance less than 10 as the candidate matching feature pairs. Then one obtains a set of candidate matching feature pairs for $F_1$ and $F_2$. For each candidate matching pair $(f_{1j}, f_{2k})$, where $f_{1j} \epsilon F_1$ and $f_{2k} \epsilon F_2$, calculate a transformation parameters $(T_x, T_y, T_s, T_\theta)$ based on the locations, scale values and dominant orientations of these two local salient features. For these two features $f_{1j}=(x_{1j}, y_{1j}, s_{1j}, \theta_{1j}, B_{1j})$ and $f_{2k}=(x_{2k}, y_{2k}, s_{2k}, \theta_{2k}, B_{2k})$, calculate the transformation parameters as:

$$T_x = x_1 \times s_{2k}/s_{1j} - x_2 \times \cos(\theta_1 - \theta_2) - y_2 \times \sin(\theta_1 - \theta_2),$$

$$T_y = y_1 \times s_{2k}/s_{1j} + x_2 \times \sin(\theta_1 - \theta_2) - y_2 \times \cos(\theta_1 - \theta_2), \text{ where}$$

$T_s = s_{1j}/s_{2k}$ and $T_\theta = \theta_{1j} - \theta_{2k}$. If $T_s < 1.0$, set $T_x = T_x \times T_s$ and $T_y = T_y \times T_s$. Vote this parameter to 4-dimensional histogram bins over $T_x$, $T_y$, $\log(T_s)$ and $T_\theta$. Set the bin width of $T_x$ and $T_y$ to 0.25, the bin width of $\log(T_s)$ to be 0.6931, the bin width of $T_\theta$ to be 0.5236. Calculate the index of the bin as $(N_x, N_y, N_s, N_\theta)$, where $N_x = \lfloor T_x/0.25 \rfloor$, $N_y \lfloor T_y/0.25 \rfloor$, $N_s = \lfloor \log(T_s)/0.69311 \rfloor$. To calculate $N_\theta$, first transform the orientation angle $T_\theta$ to the angle $T'_\theta$ with $0 \leq T'_\theta \leq 2\pi$, then $N_\theta = \lfloor T'_\theta/0.5236 \rfloor$. Calculate four weight values $\Delta_x = T_x/0.25 - N_x$, $\Delta_y = T_y/0.25$, $\Delta_s = \log(T_s)/0.6931 - N_s$, and $\Delta_\theta = T'_\theta/0.5236 - N_\theta$. Then the candidate matching feature $(f_{i,j}, f_{2k})$ votes as follows:

the bin $(N_x, N_y, N_s, N_\theta)$ with the value $(1-\Delta_x) \times (1-\Delta_y) \times (1-\Delta_s) \times (1-\Delta_\theta)$, the bin $(N_x+1, N_y, N_s, N_\theta)$ with the value $(\Delta_x) \times (1-\Delta_y) \Delta (1-\Delta_s) \times (1-\Delta_\theta)$, the bin $(N_x, N_y+1, N_s, N_\theta)$ with the value $(1-\Delta_x) \times (\Delta_y) \times (1-\Delta_s) \times (1-\Delta_\theta)$, the bin $(N_x+1, N_y+1, N_s, N_\theta)$ with the value $(\Delta_x) \times (\Delta_y) \times (1-\Delta_s) \times (1-\Delta_\theta)$, the bin $(N_x, N_y, N_s+1, N_\theta)$ with the value $(1-\Delta_x) \times (1-\Delta_y) \times (\Delta_s) \times (1-\Delta_\theta)$, the bin $(N_x+1, N_y, N_s+1, N_\theta)$ with the value $(\Delta_x) \times (1-\Delta_y) \times (\Delta_s) \times (1-\Delta_\theta)$, the bin $(N_x, N_y+1, N_s+1, N_\theta)$ with the value $(1-\Delta_x) \times (\Delta_y) \times (\Delta_s) \times (1-\Delta_\theta)$, the bin $(N_x+1, N_y+1, N_s+1, N_\theta)$ with the value $(\Delta_x) \times (\Delta_y) \times (\Delta_s) \times (1-\Delta_\theta)$, the bin $(N_x, N_y, N_s, N_\theta+1)$ with the value $(1-\Delta_x) \times (1-\Delta_y) \times (1-\Delta_s) \times (\Delta_\theta)$, the bin $(N_x+1, N_y, N_s, N_\theta+1)$ with the value $(\Delta_x) \times (1-\Delta_y) \times (1-\Delta_s) \times (\Delta_\theta)$, the bin $(N_x, N_y+1, N_s, N_\theta+1)$ with the value $(1-\Delta_x) \times (\Delta_y) \times (1-\Delta_s) \times (\Delta_\theta)$, the bin $(N_x+1, N_y+1, N_s, N_\theta+1)$ with the value $(\Delta_x) \times (\Delta_y) \times (1-\Delta_s) \times (\Delta_\theta)$, the bin $(N_x, N_y, N_s+1, N_\theta+1)$ with the value $(1-\Delta_x) \times (1-\Delta_y) \times (\Delta_s) \times (\Delta_\theta)$, the bin $(N_x+1, N_y, N_s+1, N_\theta+1)$ with the value $(\Delta_x) \times (1-\Delta_y) \times (\Delta_s) \times (\Delta_\theta)$, the bin $(N_x, N_y+1, N_s+1, N_\theta+1)$ with the value $(1-\Delta_x) \times (\Delta_y) \times (\Delta_s) \times (\Delta_\theta)$, the bin $(N_x+1, N_y+1, N_s+1, N_\theta+1)$ with the value $(\Delta_x) \times (\Delta_y) \times (\Delta_s) \times (\Delta_\theta)$.

After all candidate matching feature pairs have voted to the histogram bins, find the bin with largest vote value, and retrieve the set of candidate matching feature pairs voting for this bin, and reject other feature pairs as candidate feature matching pairs. If the number of this set of feature pairs is less than 10, set the similarity score of $F_1$ and $F_2$ as 0. Else input the location coordinates of this set of feature pairs to a RANSAC algorithm to estimate the homography transformation between $F_1$ and $F_2$, and output the inlier set of the candidate matching feature pairs as the true matching feature pairs. Then the similarity score of $F_1$ and $F_2$ is the number of the true matching feature pairs.

[6] Calculate Similarity Score for Two Images

For a pair of image $I_1$ and $I_2$, extract a set of local salient features $F_1=\{f_{11}, f_{12}, \ldots, f_{1M}\}$ from image $I_1$ and a set of local salient features $F_2=\{f_{21}, f_{22}, \ldots, f_{2N}\}$ from image $I_2$. Then calculate the similarity score of $F_1$ and $F_2$, and then output the similarity score of $F_1$ and $F_2$ as the similarity score of $I_1$ and $I_2$.

[7] Learn a Model for One Landmark Building from a Set of Training Images

For a single landmark building, take a set of images $\Omega_1=\{I_1, I_2, \ldots, I_N\}$ from different positions, different viewpoints and different times as training images to learn the model of the landmark building. For each image pair $(I_i, I_j)$, $I_i \epsilon \Omega_I$, $I_j \epsilon \Omega_I$, and $i \neq j$, calculate their similarity score $s_{ij}$. Then for each image $I_i$, calculate its total similarity score $S_i = \Sigma_{j=1,j \neq i}^{N} s_{ij}$. Find the image $I^*$ with the largest value of the total similarity score, then select other images that have similarity scores with $I^*$ greater than 16. Then select $I^*$ as a prototype of the landmark building and exclude $I^*$ and the set of images from $\Omega_I$, and recalculate the total similarity scores of the remaining images in $\Omega_I$ by summing only the similarity scores remaining in $\Omega_I$. Repeat the above process to find the image with the largest total similarity score value as the second prototype of the building, and exclude this image and the images that have a similarity score with the second prototype greater than 16. This process is repeated until $\Omega_I = \emptyset$. The selected images are the set of prototypes $\Omega_P=\{P_1, \ldots, P_k\}$ to model the landmark building.

[8] Construct a Database of Landmark Building Models

The database has a global record that has a field to store the number of landmark building models in the database, a field to store the address of the first landmark building model record and a field to store the address of free storage. Each landmark building model record has a field to store an integer as the landmark building's ID, a field to store the number of prototype records of this landmark building, a field to store the address of the first prototype record and a field to store the address of the next prototype record. Each prototype record has a field to store the number of local salient features in the prototype, a field to store the address of its first local salient feature record and a field to store the address of the next prototype record of this landmark building. Each local salient feature record has fields to store its location (x, y), its scale value s, its dominant orientation $\theta$ and its compact descriptor B, as well as a field to store the address of the next local salient feature record.

[9] Calculate the Similarity Score of One Image with a Prototype of One Landmark Building Model To calculate the similarity score of one image/with a prototype P, first extract salient features $F_I$ from I, and retrieve the salient features $F_P$ from the landmark building database, then calculate the similarity score of $F_I$ and $F_P$, and return this similarity score of $F_I$ and $F_P$ as the similarity score of I and P.

[10] Calculate the Similarity Score of One Image with One Landmark Building Model To calculate the similarity score of one image I with one landmark building model that has a set of prototypes $\Omega_P=\{P_1, \ldots, P_k\}$, first calculate the similarity score $s_i$ of image I with the prototype $P_i$, $1 \leq i \leq k$, and then output the largest value of $s_i$ ($1 \leq i \leq k$) as the similarity score of the image I with the landmark building model.

[11] Update Landmark Building Model Database

[11.1] Add a New Landmark Building Model to the Database

First allocate free storage space to store the new landmark model record, then insert this record into the landmark model record list by storing the address of the first landmark model record into this new model record's field, and store this new model record's address into the field of the global record to make this new model record become the first model record. The number of landmark building models is increased by 1 and updated for the global record.

[11.2] Delete a Landmark Building Model from the Database

Find the landmark building model record by the landmark building ID, and then delete this model record from the model list. The storage space is freed for future use. The number of the building models is decreased by 1 and the corresponding field of the global record is updated.

[11.3] Update the Existing Landmark Building Model in the Database with More Training Images For a set of new training images of one landmark building, first calculate the similarity scores of these images with the existing model of the landmark building. For the images with similarity score greater than 16, exclude them from the training images. Then learn new prototypes from the rest images, and add the learned new prototypes to the model record of the landmark building in the model database.

[12] Construct Landmark Building Information Database

The database has a global record which has a field to store the number of landmark buildings, a field to store the address of the first landmark building record, and a field to store the free storage for future use. Each landmark building record has a field to store the landmark building ID, a field to store the number of information records of this landmark building, a field to store the address of the first information record, and a field to store the next landmark building record. Each information record has a field to store the information type, a field to store the address of the information, a field to store the size of the information and a field to store the next information record.

[13] Update Landmark Building Information Database

[13.1] Add a New Information Record for an Existing Landmark Building to the Information Database Create a new information record to store the input information, and insert this information record to the information record list of the landmark building record. Increase the number of information records by 1, and update corresponding fields of the landmark building record.

[13.2] Delete an Information Record from the Information Database

Delete the information record from the information record list of the landmark building record, and decrease the number of the information records by 1, and update corresponding field of the landmark building record. If the number of the information records reach 0, delete the landmark building record, and decrease the number of landmark building record by 1. The storage space is freed for future use.

[13.3] Add a New Information Record for a New Landmark Building to the Information Database First create a new landmark building record for the new landmark building, and insert this new landmark building record to the landmark building record list. The number of the landmark building records is increased by 1. Then create a new information record to store the input new information, and add this new information record to the new landmark building record, and set the number of information records of the new landmark building record to be 1.

[14] Recognize Landmark Building from an Input Image

For an input image I, calculate its similarity scores with all landmark building models stored in the database, and calculate the largest value of these similarity scores, if this value is greater than 8, the corresponding landmark building ID is output as the recognized landmark building. Else no landmark building is recognized in the input image, and a value of −1 is output to indicate no landmark building is recognized in the input image.

[15] Display the Recognition Result

Users capture an image and input this image for landmark building recognition, and the system provides a visual interface or an audio interface or both of them to provide the landmark building recognition result to the user. If there is a recognized landmark building in the input image, the related information is retrieved from the landmark building information database based on the recognized building's ID, and the building's location information is displayed to the user, including the building's name and other basic information. The system provides an interface permitting user options for further information of the recognized building. If there is no landmark building recognized in the input image, the system provides suggestions and directions to the users to help them to capture more images for building recognition.

The invention has been described with reference to specific embodiments. Other embodiments will be evident to those of skill in the art. It is therefore not intended that this invention be limited, except as indicated by the appended claims.

What is claimed is:

1. A method for recognizing landmark buildings shown in an input image and locating recognized landmark buildings on a map with related information, the method comprising:
    capturing a set of training images of one landmark building and learning a model of the landmark building from the set of training images;
    determining similarity scores for image pairs of different ones of said training images;
    clustering the training images into a set of prototypes based upon the similarity scores of said each pair of training images;
    storing said set of models learned for a set of landmark buildings to a storage device to build a first model database, wherein each model of one landmark building from said set of landmark buildings has a record in said database indexed by an identifier code for said landmark building, and each prototype has a record in said database linked to the record of corresponding landmark building model;
    capturing an input image of a candidate building;
    calculating the similarity score between said input image and each model stored in the model database;
    recognizing the building in said input image based on the largest value of the similarity scores between said input image and the models stored in the first database;
    locating the recognized landmark building on an electronic map;
    retrieving information related to the recognized landmark building from a second database operative under control of a processor circuit; and
    displaying the related information of the recognized landmark building on a display device to an end user.

2. The method according to claim 1 wherein the prototypes producing step for one landmark building comprises:
    calculating a prototypic score for each image in the training image set of one landmark building by summing all similarity scores of said each image with other images in said training image set, and selecting the image with the largest prototypic score as the first prototype of said landmark building;

excluding the selected prototype image and the images which have similarity scores as said selected prototype image greater than a threshold from said training image set, then updating prototypic score for each image in the updated training image set by summing all similarity scores of said each image with other images in said updated training image set, and selecting the image with the largest prototypic score as the next prototype of said landmark building;

repeating the above process until there is less than two images in said training image set, and if there is only one image in the training image set, selecting said only one image as the last prototype of said landmark building; and storing the local salient features extracted from each prototype image as feature records to the first database linked to one prototype record of said prototype, which is linked to the model record of said landmark building.

3. The method according to claim 1 wherein producing the similarity score of one pair of training images comprises:

extracting a set of local salient features from each image of said training image pair;

generating descriptors for each local salient feature extracted from the images of said training image pair;

calculating the similarity score of the set of local salient features extracted from one image of said image pair with the set of local salient features extracted from the other image of said image pair; and returning the similarity score of said two sets of local salient features as the similarity score of said training image pair.

4. The method claimed in claim 3 wherein the step of producing a set of local salient features for one image comprises:

producing an image pyramid by successively smoothing and sub-sampling said image;

for each image level of the image pyramid, producing a set of multi-scale saliency maps; and locating pixel saliency maxima in the set of multi-scale saliency maps with corresponding scale value.

5. The method according to claim 3 comprising producing a plurality of descriptors for each local salient feature, said descriptors producing step comprising:

extracting a local image region around a feature point with size proportional to scale value of said feature point;

calculating the gradient field of said local image region;

calculating dominant orientations of the said extracted local region;

for each dominant orientation, normalizing the gradient field according to this dominant orientation, and subdividing said local image region to several overlapped sub-regions relative to the dominant orientation;

for each sub-region, creating an orientation histogram based on the magnitude and normalized orientation field according to the dominant orientation, and transforming this histogram to a binary bit string; and assembling said binary bit strings of said sub-regions into one global binary bit string according to an order relative to said dominant orientation as one descriptor corresponding to the feature point with said dominant orientation.

6. The method according to claim 3 wherein the similarity score for two sets of local salient features is produced by:

calculating Hamming distance of the descriptors of each feature pair from said two sets of local salient features, with one feature each from the said two sets of local salient features, and adding each said feature pair to a candidate matching feature pair set if said Hamming distance less than a threshold;

estimating the geometric transformation parameter value by matching locations, scale values, and dominant orientations of the two features from each feature pair, and voting the resultant parameter value to bins of a histogram of geometric transformation parameter space;

selecting the histogram bin with the largest voting value, and finding the set of features voting positive values to the bin so selected to form a refined candidate matching feature pair set;

applying a RANSAC algorithm to said refined candidate matching feature pair set to estimate the geometric transformation parameter, and finding the inlier set of matching feature pairs from said refined candidate matching feature pair set as the true matching feature pair set; and returning the number of feature pairs in said true matching feature set as the similarity score of said two sets of local salient features if said number is greater than a threshold; otherwise, returning the similarity score of said two sets of local salient features as zero.

7. The method according to claim 5 comprising producing a plurality of dominant orientations for the local image region corresponding to one feature point, said dominant orientations producing step comprising:

calculating the gradient field of said local image region;

calculating gradient orientation and gradient magnitude for each pixel in the local image region, the gradient magnitude being weighted by a Gaussian function with deviation proportional to the size of the said local image region;

for each pixel in the local image region, voting the corresponding orientation with the value of weighted orientation magnitude;

selecting as candidates of dominant orientations maxima of the orientation histogram; and selecting as the dominant orientations of the local image region the orientation with the largest vote value and such other orientations with maximal vote value not less than a threshold relative to the largest vote value.

8. The method according to claim 1 further comprising producing a tag to indicate the recognized landmark building in one input image, said tag producing step comprising:

calculating similarity scores of said input image with each landmark building model stored in the first database;

calculating the largest value of the similarity scores of said input image with all landmark building models stored in the first database, and recording the corresponding landmark building's ID; and returning said landmark building's ID as the tag of recognized landmark building in said input image if the said largest similarity score is greater than a threshold; otherwise, returning nothing to indicate no landmark building is recognized in said input image.

9. The method according to claim 8 wherein producing the similarity score for said input image with one prototype of one landmark building stored in the landmark building model database comprises:

extracting the set of local salient features from said input image and creating descriptors for each local salient feature;

retrieving the set of local features of said prototype from the landmark building model database; and calculating the similarity score value of the set of local features from said input image and the set of local features from said prototype, and return this similarity score value as the similarity score of said input image with said prototype.

10. The method according to claim 9 wherein said similarity score producing step comprises comparing similarity scores of said input images with all prototypes of the said landmark building, and selecting the largest similarity score value as the similarity score of said input image with the said landmark building model.

11. The method according to claim 1 wherein the step of localizing the recognized landmark building in an input image on a map with related information comprises:

retrieving the location information of the landmark building from information stored in a storage device indexed by the landmark buildings, then the marking on the location of said recognized landmark building, and then retrieving for display from the information database indexed by landmark building the related information of the recognized landmark building.

12. A system for recognizing landmark buildings in an image and for locating the recognized buildings on a map with related information, the system comprising:

at least one processor circuit and at least one storage, said circuit and storage configured for:
learning models of landmark buildings from a set of training images stored in a first database operative under control of at the least one processor circuit, said learning for each landmark building comprising:
determining a similarity score between each pair of the training images within said set;
clustering the training images into a set of prototypes based on the similarity score of each pair of training images; and
storing the set of prototypes to the at least one storage to build a model database of the landmark buildings for subsequent comparison with input images of candidate buildings; and at least one processor circuit, at least one storage and a display device configured for:
inputting an image of a candidate building to the at least one processor circuit;
calculating a similarity score of the input image to a model of each landmark building, said calculating comprising comparing local salient features extracted from the input image with local salient features of prototypes of landmark buildings stored in a model database, in order to recognize the landmark building;
locating the recognized building on an electronic map;
retrieving information related to the recognized building from a second database operative under control of the at least one processor circuit; and
displaying the related information of the recognized landmark building on the display device to an end user.

13. The system according to claim 12 wherein
the at least one processor
and storage are further configured for:
clustering the local salient features extracted from the set of training images, the training images being taken from different positions, different viewpoints and different times of each landmark building.

14. An apparatus for use in a system for recognizing landmark buildings in an image and for locating the recognized buildings on a map with related information, the system comprising:

at least one processor circuit and at least one storage, said circuit and storage configured for:
learning models of landmark buildings from a set of training images stored in a first database operative under control of at the least one processor circuit, said learning for each landmark building comprising:
determining a similarity score between each pair of the training images within said set;
clustering the training images into a set of prototypes based on the similarity score of each pair of training images; and
storing the set of prototypes to the at least one storage to build a model database of the landmark buildings for subsequent comparison with input images of candidate buildings; and at least one processor circuit, at least one storage and a display device configured for:
inputting an image of a candidate building to the at least one processor circuit;
calculating a similarity score of the input image to a model of each landmark building, said calculating comprising comparing local salient features extracted from the input image with local salient features of prototypes of landmark buildings stored in a model database, in order to recognize the landmark building;
locating the recognized building on an electronic map;
retrieving information related to the recognized building from a second database operative under control of the at least one processor circuit; and
displaying the related information of the recognized landmark building on the display device to an end user.

15. An apparatus for use in a system for recognizing landmark buildings in an image and for locating the recognized buildings on a map with related information, the system comprising:

at least one processor circuit and at least one storage, said circuit and storage configured for:
capturing a set of training images of one landmark building and learning a model of the landmark building from the set of training images;
determining similarity scores for image pairs of different ones of said training images;
clustering the training images into a set of prototypes based upon the similarity scores of said each pair of training images;
storing said set of models learned for a set of landmark buildings to a storage device to build a first model database, wherein each model of one landmark building from said set of landmark buildings has a record in said database indexed by an identifier code for said landmark building, and each prototype has a record in said database linked to the record of corresponding landmark building model;
inputting an input image of a candidate building;
calculating the similarity score between said input image and each model stored in the first model database;
recognizing the building in said input image based on the closest value of the similarity scores between said input image and the models stored in the first model database;
locating the recognized landmark building on an electronic map;
retrieving information related to the recognized landmark building from a second database operative under control of a processor circuit; and
providing the related information of the recognized landmark building to an end user.

* * * * *